US010972861B2

(12) United States Patent
Yang et al.

(10) Patent No.: US 10,972,861 B2
(45) Date of Patent: Apr. 6, 2021

(54) ELECTRONIC DEVICE AND SYSTEM FOR PROVIDING POINT OF INTEREST INFORMATION

(71) Applicant: Samsung Electronics Co., Ltd., Gyeonggi-do (KR)

(72) Inventors: Jong-Eun Yang, Seoul (KR); Jinho Moon, Gyeonggi-do (KR)

(73) Assignee: Samsung Electronics Co., Ltd ( * ) Notice: Subject to any disclaimer, the term of this patent is extended or adjusted under 35 U.S.C. 154(b) by 213 days.

(21) Appl. No.: 15/802,011

(22) Filed: Nov. 2, 2017

(65) Prior Publication Data
US 2018/0160261 A1 Jun. 7, 2018

(30) Foreign Application Priority Data
Dec. 2, 2016 (KR) .......................... 10-2016-0163389

(51) Int. Cl.
H04W 4/021 (2018.01)
H04W 4/80 (2018.01)
(Continued)

(52) U.S. Cl.
CPC .......... *H04W 4/021* (2013.01); *G06Q 20/325* (2013.01); *G06Q 20/3224* (2013.01); *H04W 4/80* (2018.02); H04W 4/024 (2018.02)

(58) Field of Classification Search
CPC ......... G06Q 20/3278; G06Q 20/40145; G06Q 20/327; G06Q 20/34; G06Q 20/32;
(Continued)

(56) References Cited

U.S. PATENT DOCUMENTS 9,154,916 B2    10/2015  Lerner et al.
2010/0280956 A1* 11/2010  Chutorash .............. G06Q 20/20
                                                            705/64
(Continued)

FOREIGN PATENT DOCUMENTS

EP      2 843 367        3/2015
KR   1020150094889       8/2015

OTHER PUBLICATIONS

International Search Report dated Feb. 23, 2018 issued in counterpart application No. PCT/KR2017/012465, 11 pages.

*Primary Examiner* — Alexander G Kalinowski
*Assistant Examiner* — Sanjeev Malhotra
(74) *Attorney, Agent, or Firm* — The Farrell Law Firm, P.C.

(57) ABSTRACT

An electronic device is provided. The electronic device includes a housing, a touch screen display, an antenna, a wireless communication circuit, a sensor, a processor, and a memory electrically, wherein, based on instructions stored in the memory, the processor is configured to collect data indicating a location of the electronic device using one of the wireless communication circuit and the sensor, temporarily store the data in the memory, while directly establishing a wireless connection with an external electronic device, transmit payment-related information to the external electronic device using the wireless communication circuit, receive or acquire information of a POI which is associated with the payment-related information and is located within a predetermined range from a payment generation location through the wireless communication circuit, and transmit, to an external server through the wireless communication circuit, a portion of the stored data and the POI information either before or after transmitting the payment-related information.

11 Claims, 30 Drawing Sheets

(51) Int. Cl.
*G06Q 20/32* (2012.01)
*H04W 4/024* (2018.01)

(58) Field of Classification Search
CPC .... G06Q 20/20; G06Q 20/204; G06Q 20/385; G06Q 20/10; G06Q 20/227; G06Q 20/3224; G06Q 20/36; G06Q 20/4012; G06Q 20/405; G06Q 20/202; G06Q 20/3223; G06Q 20/3227; G06Q 20/3255; G06Q 20/3274; G06Q 20/341; G06Q 20/351; G06Q 20/38; G06Q 20/40; G06Q 20/401; G06Q 20/4014; H04B 5/0031; H04B 5/0037; H04W 4/00; H04M 1/7253; H04M 2250/04
USPC ...................................... 705/64, 75; 455/466
See application file for complete search history.

(56) References Cited

U.S. PATENT DOCUMENTS

| | | | |
|---|---|---|---|
| 2013/0117155 A1 | 5/2013 | Glasgo | |
| 2014/0088864 A1 | 3/2014 | Lamarca et al. | |
| 2015/0148061 A1 | 5/2015 | Koukoumidis et al. | |
| 2015/0345969 A1 | 12/2015 | McGavran et al. | |
| 2016/0165417 A1* | 6/2016 | Yang | G06F 16/903 455/466 |
| 2016/0247144 A1* | 8/2016 | Oh | G06Q 20/20 |
| 2016/0253669 A1* | 9/2016 | Yoon | G06Q 20/36 705/75 |
| 2017/0017937 A1* | 1/2017 | Lim | G06Q 20/385 |
| 2017/0017952 A1* | 1/2017 | Choi | G06Q 20/326 |
| 2017/0017961 A1* | 1/2017 | Kim | G06Q 20/204 |
| 2017/0126264 A1* | 5/2017 | Nam | H04B 5/0031 |
| 2017/0163076 A1* | 6/2017 | Park | H02J 50/10 |
| 2017/0186015 A1* | 6/2017 | Jin | G06Q 20/32 |
| 2017/0215042 A1* | 7/2017 | Lee | H04W 4/027 |
| 2017/0244822 A1* | 8/2017 | Park | H04B 5/0031 |
| 2017/0244823 A1* | 8/2017 | Kim | H04B 5/0037 |
| 2017/0270523 A1* | 9/2017 | Choi | G06Q 30/0613 |
| 2017/0330188 A1* | 11/2017 | Canh | G06Q 20/385 |
| 2018/0033013 A1* | 2/2018 | Park | G06Q 20/325 |
| 2018/0068312 A1* | 3/2018 | Kim | G06Q 20/227 |
| 2018/0137488 A1* | 5/2018 | Kim | G06Q 20/40145 |
| 2018/0341937 A1* | 11/2018 | Kim | G06Q 20/40145 |
| 2019/0026725 A1* | 1/2019 | Park | G06Q 20/3224 |
| 2019/0102770 A1* | 4/2019 | Kim | H04W 4/00 |
| 2019/0156325 A1* | 5/2019 | Kim | H04W 88/02 |

* cited by examiner

| Sensor Data | |
|---|---|
| Wi-Fi | name : A coffee, address : 00:23:DF:CE:2C:30 |
| | name : ip-time, address : 00:14:CE:DF:KS:41 |
| Bluetooth | name : 2pinz, address : DB:9E:3F:B4:A4:3E |
| ⋮ | |

FIG.9A

| Location | Latitude : 37.5003556 |
|---|---|
| | Longitude : 127.0247803 |

| Payment Info(POI data) | |
|---|---|
| Name | Gangnam, A coffee |
| Location | Latitude : 37.5003556 |
| | Longitude : 127.0247803 |
| ... | |

FIG.14B

| | Sensor Data |
|---|---|
| Wi-Fi | name : A coffee, address : 00:23:DF:CE:2C:30 |
| | name : ip-time, address : 00:14:CE:DF:KS:41 |
| Bluetooth | name : 2pinz, address : DB:9E:3F:B4:A4:3E |
| ... | |

FIG.14C

| POI - Sensor Mapping DB | | |
|---|---|---|
| Gangnam, A coffee | name : A coffee, address : 00:23:DF:CE:2C:30 | Wi-Fi |
| | name : ip-time, address : 00:14:CE:DF:KS:41 | Wi-Fi |
| Lat : 37.50003556, Lng : 127.0247803 | name : 2pinz, address : DB:9E:3F:B4:A4:3E | Bluetooth |
| ... | | |

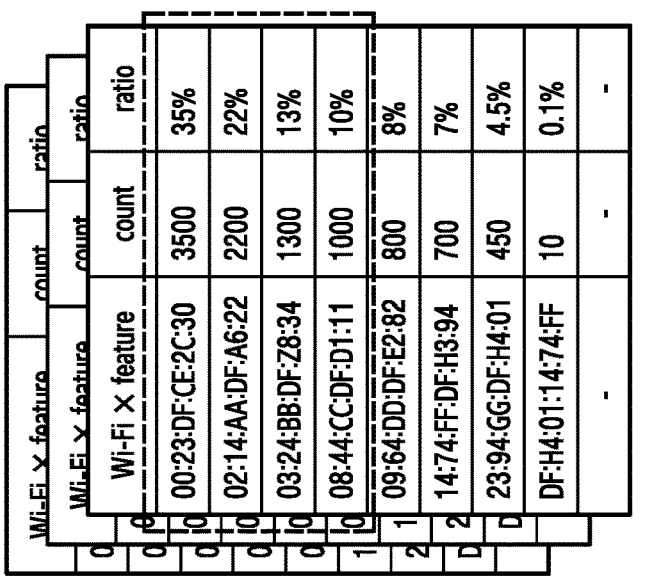
FIG.20C
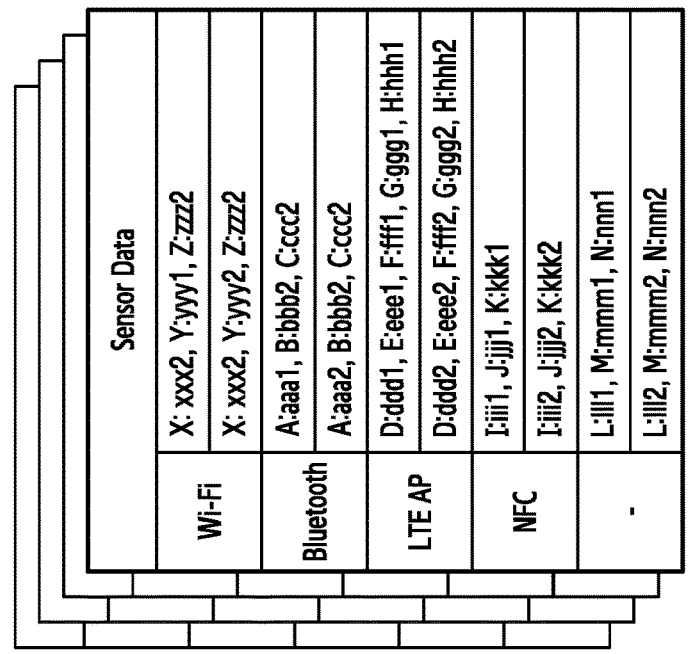
FIG.20B
FIG.20A

FIG.27A

| | Sensor Data |
|---|---|
| Wi-Fi | name : A coffee, address : 00:23:DF:CE:2C:30 |
| | name : ip-time, address : 00:14:CE:DF:KS:41 |
| Bluetooth | name : 2pinz, address : DB:9E:3F:B4:A4:3E |
| | ... |

FIG.27B

POI - Sensor Mapping DB

| Gangnam, A coffee | name : A coffee, address : 00:23:DF:CE:2C:30 | Wi-Fi |
| --- | --- | --- |
| | name : ip-time, address : 00:14:CE:DF:KS:41 | Wi-Fi |
| Lat : 37.50003556, Lng : 127.0247803 | name : 2pinz, address : DB:9E:3F:B4:A4:3E | Bluetooth |
| | ... | |

FIG.27C

| | POI data |
|---|---|
| Name | Gangnam, A coffee |
| Location | Latitude : 37.5003556 |
| | Longitude : 127.0247803 |

ELECTRONIC DEVICE AND SYSTEM FOR PROVIDING POINT OF INTEREST INFORMATION

PRIORITY

The present application claims priority under 35 U.S.C. § 119(a) to Korean Patent Application Serial No. 10-2016-0163389, which was filed in the Korean Intellectual Property Office on Dec. 2, 2016, the contents of which are incorporated herein by reference.

BACKGROUND

1. Field of Disclosure

The present disclosure relates generally to an electronic device, and more particularly, to a method for providing point of interest (POI) information and an electronic device supporting the same.

2. Description of the Related Art

In view of the development of information and communication technology and semiconductor technology, various electronic devices are increasingly being distributed and used. The electronic devices are configured to support various functions, such as being able to receive information on their locations from a global positioning system (GPS) satellite, and being able to provide this information to users. Electronic devices are also capable of using one or more map services and/or navigation services using the location information.

SUMMARY

The present disclosure has been made to address at least the disadvantages described above and to provide at least the advantages described below. Accordingly, an aspect of the present disclosure provides a method for providing POI information including information on where an electronic device is located.

In accordance with an aspect of the present disclosure, there is provided an electronic device. The electronic device includes a housing, a touch screen display, an antenna, a wireless communication circuit electrically connected to the antenna, a sensor configured to collect data indicating environments where the electronic device is located, a processor electrically connected to the touch screen display, the wireless communication circuit, and the sensor, and a memory electrically connected with the processor, wherein, based on instructions stored in the memory, the processor is configured to collect data indicating a location of the electronic device using one of the wireless communication circuit and sensor, temporarily store the data in the memory, while directly establishing wireless connection with an external electronic device, transmit payment-related information to the external electronic device using the wireless communication circuit, receive or acquire information of a POI (point of interest) which is associated with the payment-related information and is located within a predetermined range from a payment generation location through the wireless communication circuit, and transmit, to an external server through the wireless communication circuit, a portion of the stored data and the POI information either before or after transmitting the payment-related information.

In accordance with an aspect of the present disclosure, there is provided an electronic device. The electronic device includes a network interface, a processor electrically connected with the network interface, and a memory electrically connected with the processor, wherein, based on instructions stored in the memory, the processor is configured to through the network interface, receive first data indicating a portion of a location of a first portable electronic device and POI (point of interest) information related to the first data, store the first data and the POI information in a database, through the network interface, receive second data indicating a portion of a location of a second portable electronic device without POI information related to the second data, compare the second data with the first data, and when the second data is identical to the first data, provide the POI information related to one or the first data and different information related to the POI.

In accordance with an aspect of the present disclosure, there is provided a server system. The server system includes a network interface, a processor electrically connected with the network interface, and a memory electrically connected with the processor, wherein, based on instructions stored in the memory, the processor is configured to through the network interface, receive first data indicating a portion of a location of a first portable electronic device and POI (point of interest) information related to the first data, store the first data and the POI information in a database, through the network interface, receive second data indicating a portion of a location of a second portable electronic device without POI information related to the second data, compare the second data with the first data, and when the second data is identical to the first data, provide the POI information related to one or the first data and different information related to the POI.

BRIEF DESCRIPTION OF THE DRAWINGS

The above and other aspects, features and advantages of certain embodiments of the present invention will be more apparent from the following detailed description taken in conjunction with the accompanying drawings, in which:

FIGS. 9A and 9B are diagrams of a method for collecting sensing data, according to an embodiment of the present disclosure;

FIGS. 14A to 14C are diagrams of a method for mapping sensing data and POI information in an electronic device, according to an embodiment of the present disclosure;

FIGS. 20A to 20C are diagrams of a method for establishing a system for providing POI information in a POI server, according to an embodiment of the present disclosure;

FIGS. 27A to 27C are diagrams of a method for providing POI information in a POI server, according to an embodiment of the present disclosure;

DETAILED DESCRIPTION

Figure 1:
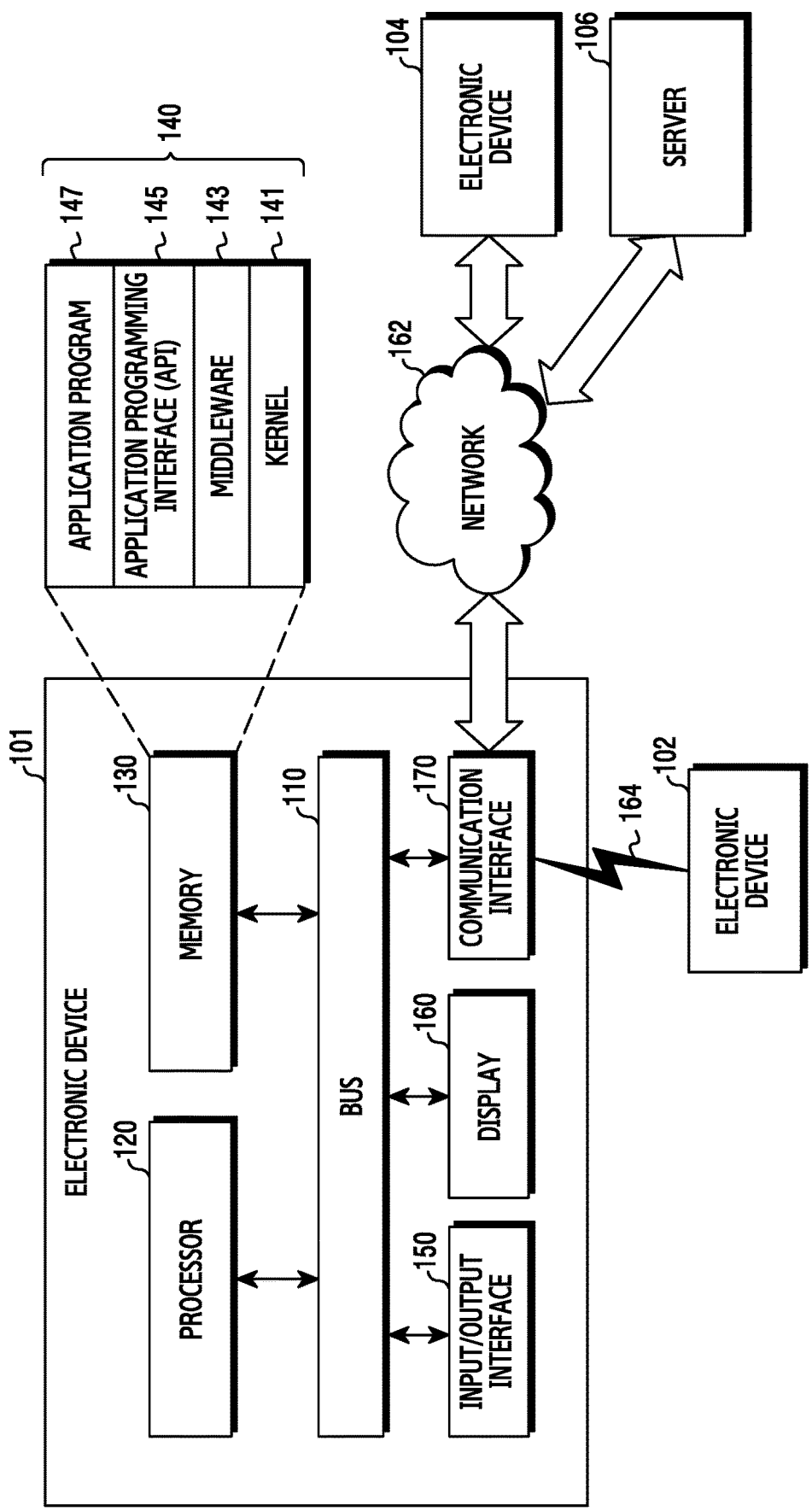
FIG. 1 is a diagram of an environment of a network including an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (e.g., elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element without departing from the scope of the present disclosure.

It will be understood that, when an element (e.g., a first element) is "(operatively or communicatively) coupled with/to" or "connected to" another element (e.g., a second element), the element may be directly coupled with/to another element, and there may be an intervening element (e.g., a third element) between the element and another element. To the contrary, it will be understood that, when an element (e.g., a first element) is "directly coupled with/to" or "directly connected to" another element (e.g., a second element), there is no intervening element (e.g., a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even terms defined in this disclosure should not be interpreted as excluding embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an application-specific integrated circuit (ASIC) chip, a field-programmable gate arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

FIG. 1 is a block diagram of a network environment, according to an embodiment of the present disclosure. Referring to FIG. 1, an electronic device 101, 102, 104 or a server 106 may be connected with each other through a network 162 or a short range communication 164. The electronic device 101 may include a bus 110, a processor 120, a memory 130, an input/output interface 150, a display 160, and a communication interface 170. The electronic device 101 may omit at least one of the above elements or may further include other elements.

The bus 110 may include a circuit for interconnecting the elements 110 to 170 and transferring communication (e.g., control messages and/or data) between the elements.

The processor 120 may include one or more of a central processing unit (CPU), an application processor (AP), and a communication processor (CP). The processor 120 may carry out operations or data processing relating to control and/or communication of at least one other element of the electronic device 101.

The memory 130 may include a volatile memory and/or a non-volatile memory. The memory 130 may store instructions or data relevant to at least one other element of the electronic device 101. The memory 130 may store software and/or a program 140. The program 140 may include a kernel 141, middleware 143, an application programming interface (API) 145, and/or an application program(s) (or application) 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143 may function as an intermediary for allowing the API 145 or the application 147 to communicate with the kernel 141 to exchange data.

In addition, the middleware 143 may process one or more task requests received from the application 147 according to priorities thereof. The middleware 143 may assign priorities for using the system resources (e.g., the bus 110, the processor 120, the memory 130, or the like) of the electronic device 101, to the application 147. The middleware 143 may perform scheduling or loading balancing on the one or more task requests by processing the one or more task requests according to the priorities assigned thereto.

The API 145 is an interface through which the application 147 control functions provided from the kernel 141 or the middleware 143, and may include at least one interface or function (e.g., instruction) for file control, window control, image processing, or text control.

The input/output interface 150 may function as an interface that may transfer instructions or data input from a user or another external device to the other element(s) of the electronic device 101. Also, the input/output interface 150 may output, to the user or another external device, commands or data received from the element(s) other than the input/output interface 150 within the electronic device 101.

Examples of the display 160 may include a liquid crystal display (LCD), a light-emitting diode (LED) display, an organic light-emitting diode (OLED) display, a microelectromechanical systems (MEMS) display, and an electronic paper display. The display 160 may display various types of contents (e.g., text, images, videos, icons, or symbols) for the user. The display 160 may include a touch screen and receive a touch, gesture, proximity, or hovering input by using an electronic pen or the user's body part.

The communication interface 170 may set communication between the electronic device 101 and the electronic device 102, the electronic device 104, or the server 106. The communication interface 170 may be connected to the network 162 through wireless or wired communication to communicate with the electronic device 104 or the server 106.

The wireless communication may use at least one of long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include the short range communication 164. The short-range communication 164 may include at least one of wireless-fidelity (Wi-Fi), bluetooth (BT), near field communication (NFC), magnetic stripe transmission (MST), and global navigation satellite system (GNSS).

The MST may generate a pulse according to transmission data using an electromagnetic signal and the pulse may generate a magnetic field signal. The electronic device 101 may transmit the magnetic field signal to a POS device, and the POS device may detect the magnetic field signal using an MST reader and convert the detected magnetic field signal to an electric signal to restore the data.

The GNSS may include at least one of GPS, a global navigation satellite system (Glonass), a Beidou navigation satellite system (Beidou), and Galileo (the European global satellite-based navigation system). Hereinafter, "GPS" may be interchangeably used with the "GNSS". The wired communication may include at least one of a universal serial bus (USB), a high definition multimedia interface (HDMI), recommended standard 232 (RS-232), and a plain old telephone service (POTS). The network 162 may include at least one of a communication network such as a computer network (e.g., a local area network (LAN) or a wide area network (WAN)), the Internet, and a telephone network.

Each of the electronic devices 102 and 104 may be of a type identical to or different from that of the electronic device 101. The server 106 may include a group of one or more servers. All or some of the operations performed in the electronic device 101 may be performed in another electronic device or the electronic devices 102 and 104 or the server 106. When the electronic device 101 has to perform some functions or services automatically or in response to a request, the electronic device 101 may make a request for performing at least some functions relating thereto to the electronic devices 102 or 104 or the server 106 instead of performing the functions or services by itself or in addition. The electronic devices 102 or 104 or the server 106 may execute the requested functions or the additional functions, and may deliver a result of the execution to the electronic device 101. The electronic device 101 may process the received result as it is or additionally to provide the requested functions or services. To this end, cloud computing, distributed computing, or client-server computing technology may be used.

Figure 2:
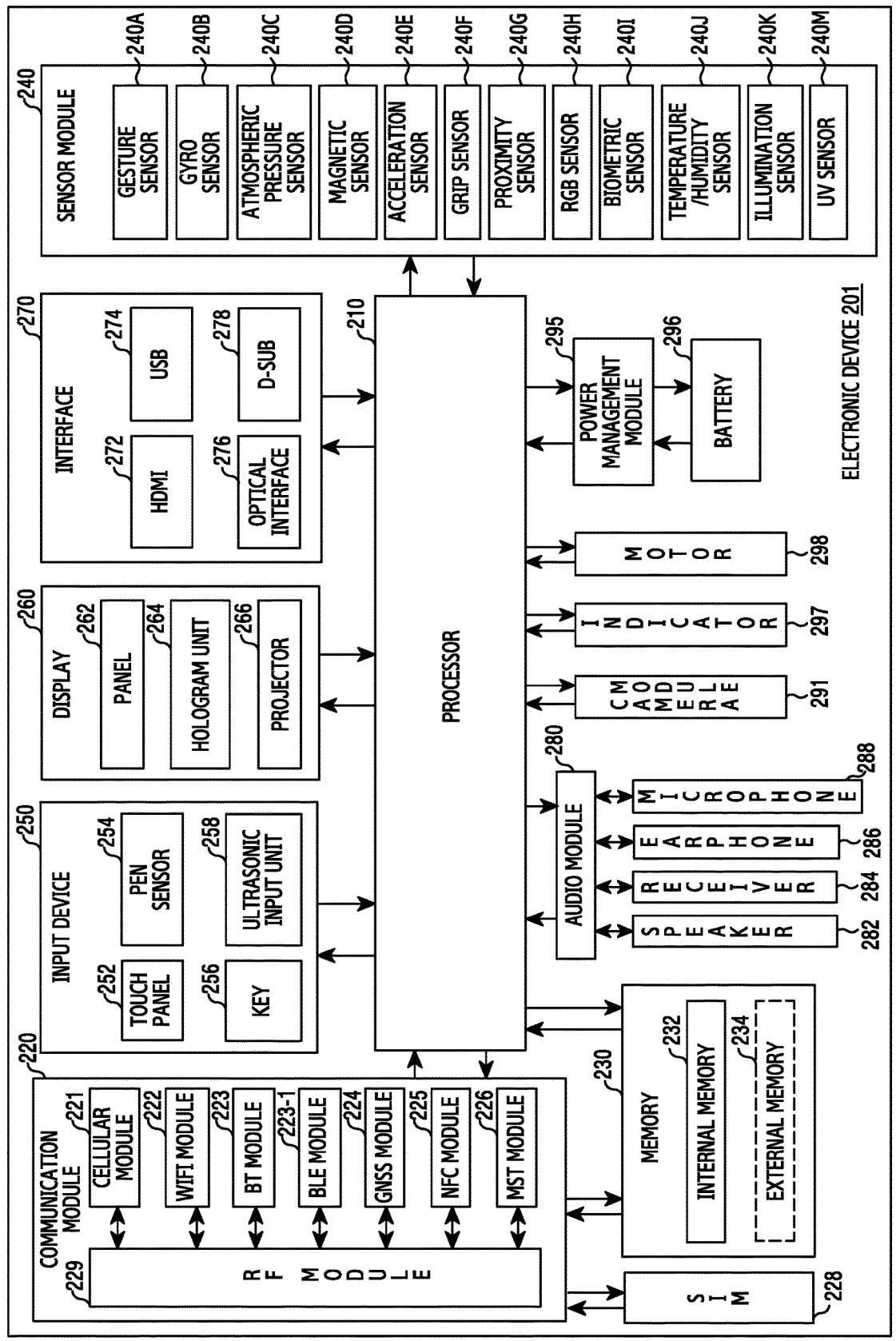
FIG. 2 is a block diagram of an electronic device, according to an embodiment of the present disclosure.

FIG. 2 is a block diagram illustrating an electronic device 201, according to an embodiment of the present disclosure. The electronic device 201 may include the whole or part of the electronic device 101 illustrated in FIG. 1. The electronic device 201 may include at least one AP 210, a communication module 220, a subscriber identification module (SIM) 228, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an AP and perform processing of various pieces of data and calculations. The processor 210 may be implemented by a system on chip (SoC). The processor 210 may further include a graphic processing unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include a cellular module 221, a Wi-Fi module 222, a BT module 223, a BT low energy (BLE) module (which is a component of the BT module) 223-1, a GNSS module 224 (e.g., a GPS module, a Glonass module, a Beidou module, or a Galileo module), an NFC module 225, an MST module 226, and a radio frequency (RF) module 229.

The cellular module 221 may provide a voice call, image call, a text message service, or an Internet service through a communication network. The cellular module 221 may distinguish between and authenticate electronic devices 201 within a communication network using the SIM 228. The cellular module 221 may perform at least some of the functions that the processor 210 may provide. The cellular module 221 may include a CP.

Each of the Wi-Fi module 222, the BT module 223, the BLE module 223-1, the GNSS module 224, the NFC module 225 and the MST module 226 may include a processor for processing data transmitted and received through the relevant module. At least some (e.g., two or more) of the cellular module 221, the Wi-Fi module 222, the BT module 223, the BLE module 223-1, the GNSS module 224, the NFC module 225, and the MST module 226 may be included in one IC or IC package.

The RF module 229 may transmit/receive a communication signal (e.g., an RF signal). The RF module 229 may include a transceiver, a power amp module (PAM), a frequency filter, a low noise amplifier (LNA), or an antenna. At least one of the cellular module 221, the Wi-Fi module 222, the BT module 223, the BLE module 223-1, the GNSS module 224, the NFC module 225, and the MST module 226 may transmit and receive RF signals through a separate RF module.

The SIM 228 may be an embedded SIM, and may contain unique identification information (e.g., an integrated circuit card identifier (ICCID)) or subscriber information (e.g., an international mobile subscriber identity (IMSI)).

The memory 230 may include an internal memory 232 or an external memory 234. The internal memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a flash memory (e.g., a NAND flash memory or a NOR flash memory), a hard driver, or a solid state drive (SSD).

The external memory 234 may further include a flash drive, e.g., a compact flash (CF), a secure digital (SD), a micro secure digital (Micro-SD), a mini secure digital (Mini-SD), an eXtreme digital (xD), a mult-media card (MMC), a memory stick, or the like. The external memory 234 may be functionally and/or physically connected to the electronic device 201 through various interfaces.

The electronic device 201 may also include a security module, which is a module including a storage space having a higher security level than that of the memory 230 and may be a circuit guaranteeing safe data storage and a protected execution environment. For example, the electronic device 201 may encrypt data (e.g., biometric information, personal information, or card information) which requires a high security level, and may store, in the security module, a key that is used for encryption. The security module may be implemented by a separate circuit and may include a separate processor. The security module may exist in a detachable smart chip or SD card, or may include embedded secure elements (eSE) embedded in a fixed chip of the electronic device 201. Further, the security module may be operated by an OS that is different from the OS of the electronic device 201. The security module may operate on the basis of a java card open platform (JCOP) operating system.

The sensor module 240 may measure a physical quantity or detect an operation state of the electronic device 201, and may convert the measured or detected information into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, an electronic device 201 may further include a processor configured to control the sensor module 240 as a part of or separately from the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use at least one of a capacitive scheme, a resistive scheme, an infrared scheme, and an ultrasonic scheme. Also, the touch panel 252 may further include a control circuit and a tactile layer and provide a tactile reaction to the user.

The (digital) pen sensor 254 may include a recognition sheet which is a part of the touch panel or is separated from the touch panel. The key 256 may include a physical button, an optical key or a keypad. The ultrasonic input device 258 may detect ultrasonic wave generated by an input tool through a microphone 288 and identify data corresponding to the detected ultrasonic waves.

The display 260 may include a panel 262, a hologram device 264 or a projector 266. The panel 262 may include a configuration identical or similar to that of the display 160 illustrated in FIG. 1. The panel 262 may be implemented to be flexible, transparent, or wearable. The panel 262 and the touch panel 252 may be configured by one module. The hologram device 264 may show a three dimensional image in the air by using an interference of light. The projector 266 may display an image by projecting light onto a screen. The screen may be located inside or outside the electronic device 201. The display 260 may further include a control circuit for controlling the panel 262, the hologram device 264, or the projector 266.

The interface 270 may include an HDMI 272, a USB 274, an optical interface 276, or a d-subminiature (D-sub) 278. The interface 270 may be included in the communication interface 170 illustrated in FIG. 1. Additionally or alternatively, the interface 270 may include a mobile high-definition link (MHL) interface, an SD card/MMC interface, or an Infrared Data Association (IrDA) standard interface.

The audio module 280 may bilaterally convert a sound and an electrical signal. At least some elements of the audio module 280 may be included in the input/output interface 145 illustrated in FIG. 1. The audio module 280 may process sound information which is input or output through a speaker 282, a receiver 284, earphones 286, the microphone 288 or the like.

The camera module 291 is a device which may photograph a still image and a dynamic image. The camera module 291 may include one or more image sensors (e.g., a front sensor or a back sensor), a lens, an image signal processor (ISP) or a flash (e.g., a light emitting diode (LED) or xenon lamp).

The power management module 295 may manage power of the electronic device 201. The power management module 295 may include a power management integrated circuit (PMIC), a charger IC, or a battery gauge. The PMIC may use a wired and/or wireless charging method. Examples of the wireless charging method may include a magnetic resonance method, a magnetic induction method, an electromagnetic method, and the like, and may further include additional circuits (e.g., a coil loop, a resonance circuit, a rectifier, etc.) for wireless charging. The battery gauge may measure a residual quantity of the battery 296, and a voltage, a current, or a temperature during the charging. The battery 296 may include or be a rechargeable battery or a solar battery.

The indicator 297 may indicate a particular state (e.g., a booting state, a message state, a charging state, or the like) of the electronic device 201 or a part (e.g., the processor 210) of the electronic device 2201. The motor 298 may convert an electrical signal into mechanical vibration, and may generate vibration, a haptic effect, or the like. Although not illustrated, the electronic device 201 may include a processing unit (e.g., a GPU) for supporting a mobile television (TV). The processing unit for supporting mobile TV may process media data according to a certain standard such as digital multimedia broadcasting (DMB), digital video broadcasting (DVB), or MediaFlo™.

Each of the components of the electronic device 201 may be implemented by one or more components, and the name of the corresponding component may vary depending on the type of the electronic device 201. The electronic device may include at least one of the aforementioned elements. Some elements may be omitted or other additional elements may be further included in the electronic device 201. Also, some of the hardware components may be combined into one entity, which may perform functions identical to those of the relevant components before the combination.

Figure 3:
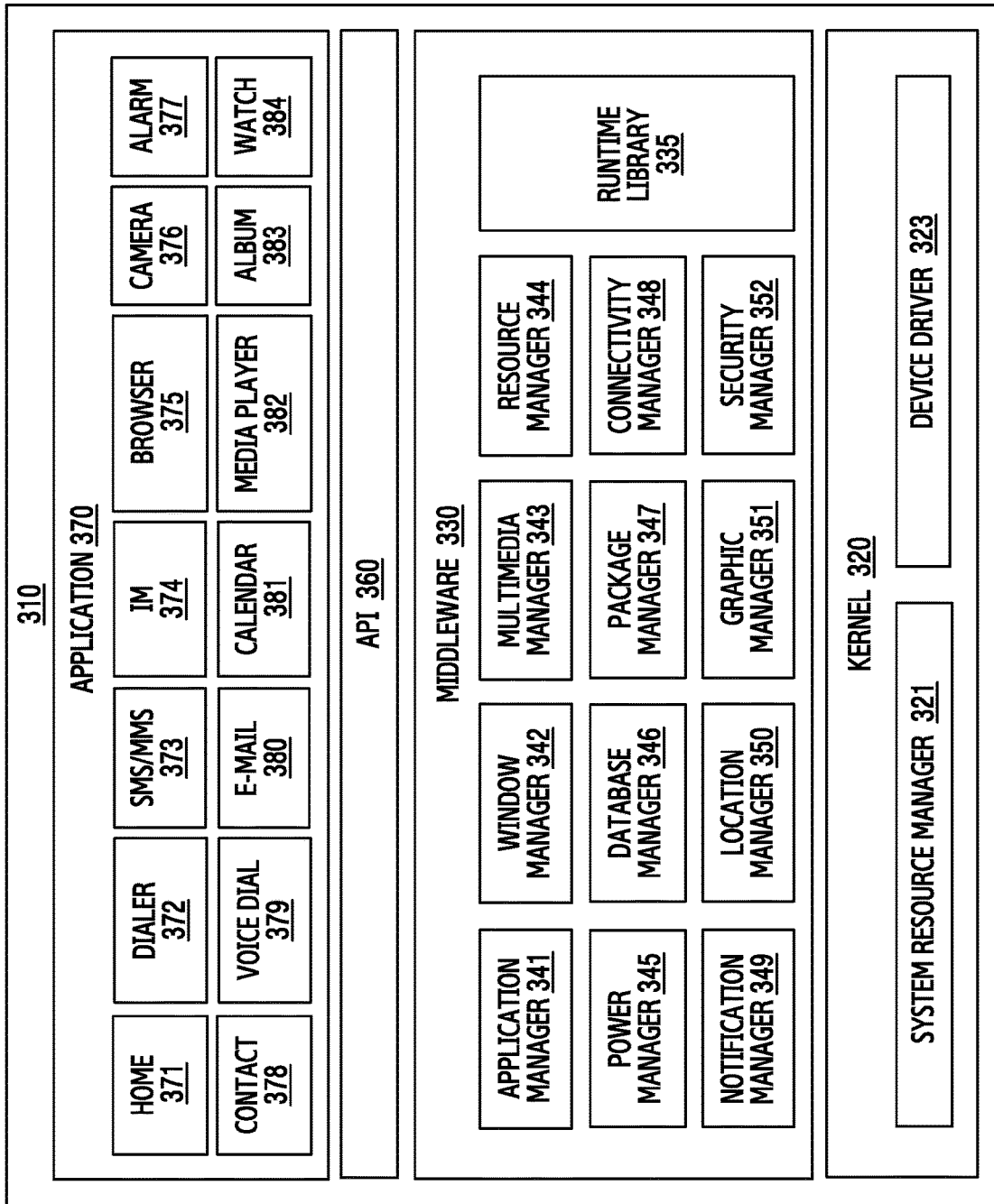
FIG. 3 is a block diagram of a program module, according to an embodiment of the present disclosure.

FIG. 3 is a block diagram of a program module 310, according to an embodiment of the present disclosure. The program module 310 may include an OS for controlling resources related to the electronic device and/or various applications executed in the OS. The OS may be Android™, iOS™, Windows™, Symbian™, Tizen™, Bada™, or the like.

The program module 310 may include a kernel 320, middleware 330, an API 360, and/or an application 370. At least some of the program module 310 may be preloaded on the electronic device, or may be downloaded from an external electronic device (e.g., the electronic devices 102 or 104, or the server 106).

The kernel 320 may include a system resource manager 321 and/or a device driver 323. The system resource manager 321 may perform the control, allocation, retrieval, or the like of system resources. The system resource manager 321 may include a process manager, a memory manager, a file system manager, or the like. The device driver 323 may include a display driver, a camera driver, a BT driver, a shared memory driver, a USB driver, a keypad driver, a Wi-Fi driver, an audio driver, or an inter-process communication (IPC) driver.

The middleware 330 may provide a function required by the application 370 in common or provide various functions to the application 370 through the API 360 so that the application 370 can efficiently use limited system resources within the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which a compiler uses in order to add a new function through a programming language while the application 370 are being executed. The runtime library 335 may perform input/output management, memory management, the functionality for an arithmetic function, or the like.

The application manager 341 may manage a life cycle of the application(s) 370. The window manager 342 may manage GUI resources used for the screen. The multimedia manager 343 may determine a format required to reproduce various media files, and may encode or decode a media file by using a coder/decoder (codec) appropriate for the corresponding format. The resource manager 344 may manage resources, such as a source code, a memory, a storage space, and the like of at least one of the application 370.

The power manager 345 may operate together with a basic input/output system (BIOS) to manage a battery or power, and may provide power information required for the operation of the electronic device. The database manager 346 may generate, search for, and/or change a database to be used by at least one of the application 370. The package manager 347 may manage the installation or update of an application distributed in the form of a package file.

The connectivity manager 348 may manage a wireless connection such as, e.g., Wi-Fi or BT. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. When the electronic device has a telephone call function, the middleware 330 may further include a telephony manager for managing a voice call function or a video call function of the electronic device. A payment manager may relay information for payment from the application 370 to the application 370 or kernel 320. Further, the payment manager may store information related to the payment, which has been received from an external device, in the electronic device or transfer the internally stored information to an external device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 is a set of API programming functions, and may be provided with a different configuration according to an OS. For example, in the case of Android™ or iOS™, one API set may be provided for each platform. In the case of Tizen™, two or more API sets may be provided for each platform.

The application 370 may include one or more applications including, but not limited to, a home application 371, a dialer application 372, an SMS/MMS application 373, an instant message application (IM) 374, a browser application 375, a camera application 376, an alarm application 377, a contacts application 378, a voice dialer application 379, an email application 380, a calendar application 381, a media player application 382, an album application 383, a clock or watch application 385, and a health care (e.g., measure exercise quantity or blood glucose), or an environment information (e.g., atmospheric pressure, humidity, or temperature information) application.

The application 370 may include an information exchange application supporting information exchange between the electronic device and an external electronic device. The information exchange application may include a notification relay application for transferring specific information to an external electronic device or a device management application for managing an external electronic device.

The notification relay application may include a function of transferring, to the external electronic device, notification information generated from other applications of the electronic device (e.g., an SMS/MMS application, an e-mail application, a health management application, or an environmental information application). Further, the notification relay application may receive notification information from an external electronic device and provide the received notification information to a user.

The device management application may manage (e.g., install, delete, or update) at least one function of an external electronic device communicating with the electronic device (e.g., a function of turning on/off the external electronic device itself (or some components) or a function of adjusting luminance (or a resolution) of the display), applications operating in the external electronic device, or services provided by the external electronic device (e.g., a call service and a message service).

The application 370 may include applications (e.g., a health care application of a mobile medical appliance or the like) according to attributes of an external electronic device. The application 370 may include an application received from the external electronic device. The application 370 may include a preloaded application or a third party application which can be downloaded from the server. Names of the elements of the program module 310 may change depending on the type of OS.

At least some of the program module 310 may be implemented in software, firmware, hardware, or a combination of two or more thereof. At least some of the program module 310 may be implemented (e.g., executed) by a processor (e.g., the processor 210). At least some of the program module 310 may include a module, a program, a routine, a set of instructions, and/or a process for performing one or more functions.

According to various embodiments, at least some of the devices (e.g., modules or functions thereof) or the method (e.g., operations) may be implemented by a command stored in a non-transitory computer-readable storage medium in a programming module form. Instructions, when executed by a processor, may cause the one or more processors to execute the function corresponding to the instruction. The non-transitory computer-readable storage medium may be, for example, the memory 130.

The non-transitory computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operations described herein.

The programming module may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4:
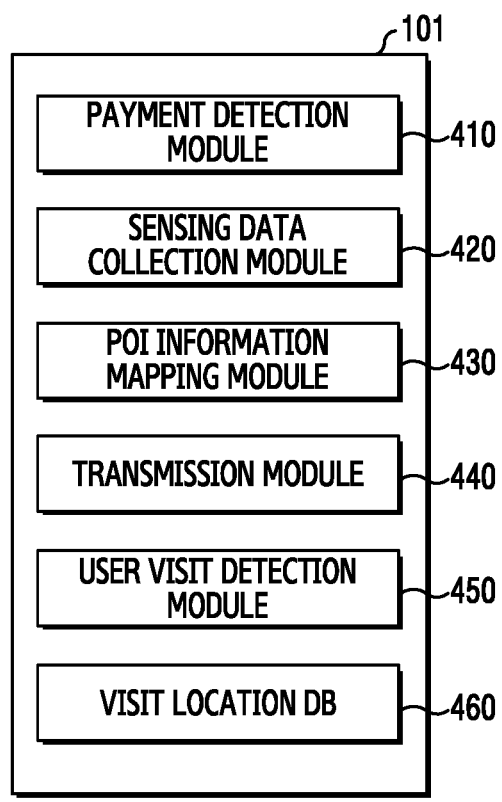
FIG. 4 is a block diagram of an electronic device, according to an embodiment of the present disclosure.

FIG. 4 is a block diagram of an electronic device (e.g., electronic device 101 including components associated therewith), according to an embodiment of the present disclosure.

Referring to FIG. 4, the electronic device may include a payment detection module 410, a sensing data collection module 420, a POI information mapping module 430, a transmission module 440, a user visit detection module 450, and a visit location database (DB) 460.

At least a portion of the payment detection module 410, the sensing data collection module 420, the POI information mapping module 430, the transmission module 440, and the user visit detection module 450 may be included in the processor 120 or may be configured in the electronic device separately from the processor 120.

The payment detection module 410 may detect payment (or a payment time). For example, when the electronic device 101 performs a payment operation using a mobile payment application or a user performs payment using a credit card or the like, the payment detection module 410 may detect payment by receiving information on payment (or a result of payment) from a finance server or the like. When the payment is detected, the payment detection module 410 may transmit, to the POI information mapping module 430, POI information included in the information on the payment and sensing data which is collected through the sensing data collection module 420.

The sensing data collection module 420 may collect and generate sensing data using one or more of a cellular radio signal, a Wi-Fi signal, a BT signal, or a NFC signal, and other radio signals, which are received at a place where the electronic device is located.

The POI information mapping module 430 may map the POI information and the sensing data, and may transmit the mapped POI information and sensing data to the transmission module 440.

The transmission module 440 may transmit the POI information and the sensing data which are mapped at the POI information mapping module 430 to a server for analyzing POI information (hereinafter, a "POI server"). The transmission module 440 may transmit the sensing data to the POI server and may receive POI information which is analyzed at the POI server.

The analyzed POI information may be stored in the visit location DB 460.

The user visit detection module 450 may detect if the user of the electronic device visits a specific place. When the user visit detection module 450 detects that the user of the electronic device 101 visits a specific place, the sensing data collection module 420 may collect sensing data. The transmission module 440 may request analysis of POI information by transmitting the collected sensing data to the POI server.

The visit location DB 460 may store (or record) information of a POI that the user visits. For example, when the electronic device receives analyzed POI information from the POI server, the POI information received from the POI server may be stored in the visit location DB 460.

Figure 5:
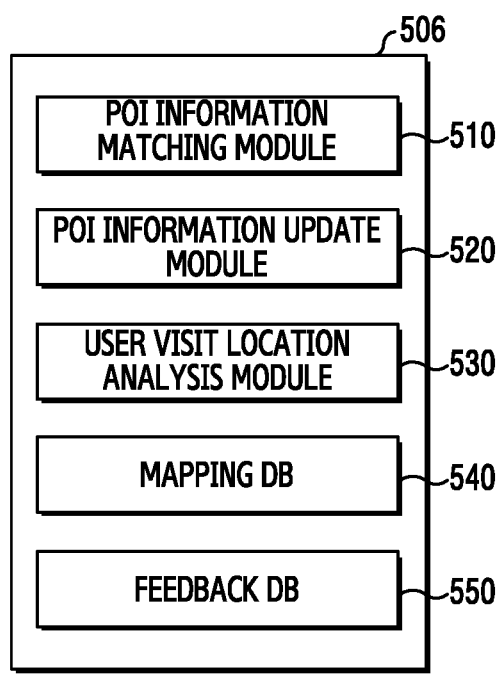
FIG. 5 is a block diagram of a server, according to an embodiment of the present disclosure.

FIG. 5 is a block diagram of a server, according to an embodiment of the present disclosure.

Referring to FIG. 5, the server 506 may include a POI information matching module 510, a POI information update module 520, a user visit location analysis module 530, a mapping DB 540, and a feedback DB 550.

When the server 506 receives POI information and sensing data which is mapped onto the POI information from the electronic device, the POI information matching module 510 may determine more exact POI information by complementing the POI information received from the electronic device 101. The server 506 may determine more exact POI information than POI information received from the electronic device, by searching the mapping DB 540 or requesting a server provided by a third party, such as a finance company server, to search.

The POI information update module 520 may store and update the POI information and the sensing data by comparing the POI information which is determined at the POI information matching module 510 and the sensing data with POI information and sensing data which are previously stored in the mapping DB 540. The POI information update module 520 may determine the most exact POI information and sensing data by analyzing sensing data accumulated with respect to the same POI information, and may store the POI information and the sensing data.

When at least one of the POI information or the sensing data is received from the electronic device, the user visit location analysis module 530 may analyze the POI that the user of the electronic device visits by comparing the received at least one of the POI information or the sensing data with at least one of POI information or sensing data stored in the mapping DB 540. When the same information or data as at least one of the POI information or the sensing data received from the electronic device is not stored in the mapping DB 540, at least one of the POI information or the sensing data received from the electronic device may be stored in the feedback DB 550.

The mapping DB 540 may map the POI information and the sensing data and store the mapped POI information and sensing data. When the POI information and the sensing data received from the electronic device are complemented by the POI information matching module 510, the mapping DB 540 may map the POI information and the sensing data which are complemented, and store the mapped POI information and sensing data.

When the same information or data as at least one of the POI information or the sensing data received from the electronic device is not stored in the mapping DB 540, the feedback DB 550 may store at least one of the POI information or the sensing data received from the electronic device.

Figure 6A:
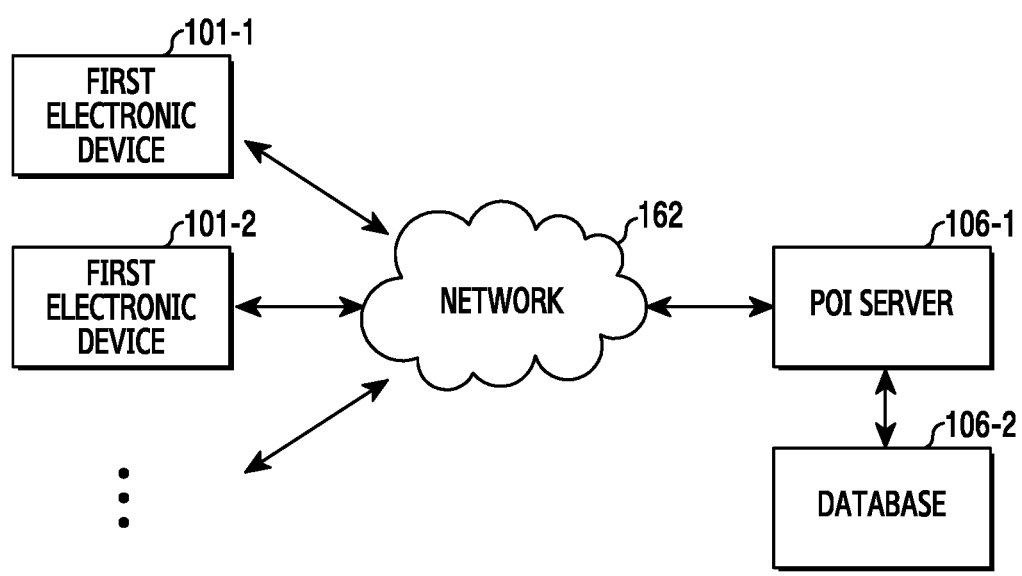
FIGS. 6A and 6B are diagrams of a method for providing POI information, according to an embodiment of the present disclosure.
Figure 6B:
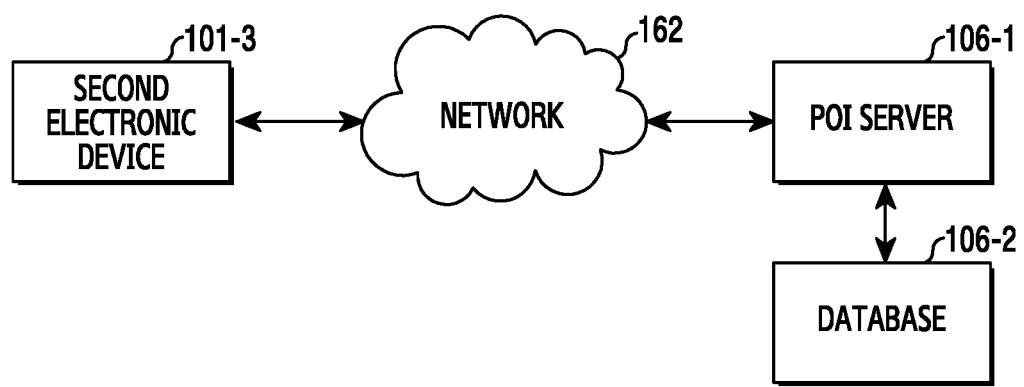

FIGS. 6A and 6B are diagrams of a method for providing POI information, according to an embodiment of the present disclosure.

FIG. 6A may be a view to illustrate a method in which a POI server 106-1 receives POI information and sensing data from a first electronic devices 101-1, 101-2, and provides POI information to the first electronic devices 101-1, 101-2 or an electronic device other than the first electronic devices 101-1, 101-2 based on at least a portion of the received POI information and sensing data. The POI server 106-1 may be referred to as a big data server. The first electronic devices 101-1, 101-2 may include an electronic device which performs a payment. The electronic device other than the first electronic devices 101-1, 101-2 may include an electronic device which does not perform a payment. However, the present disclosure is not so limited.

The POI information may include information on a place corresponding to a location of the first electronic devices 101-1, 101-2. For example, the POI information may include information on a place where the first electronic devices 101-1, 101-2 are currently located (e.g., a store, an institution, a facility, or a building). The POI information may include a name of a store where the first electronic devices 101-1, 101-2, are located.

The POI information may include information on a place related to a payment. When the first electronic devices 101-1, 101-2 perform payment using a mobile payment application, the POI information may include information on a place where the first electronic devices 101-1, 101-2 are located at the time of performing payment (or at the time of receiving a payment event). When the user performs payment using a card (e.g., a credit card) and the first electronic devices 101-1, 101-2 receive information on payment (or a result of payment) through a text message, e.g., the POI information may include information on a place where the first electronic devices 101-1, 101-2 are located at the time of receiving information on the payment.

The POI information may include information on a location within a predetermined range (or distance) from a payment generation location. The POI information may include information on a location within a 10 meter radius from a location where payment is performed.

The sensing data may include data which is sensed at a place where the first electronic devices 101-1, 101-2 re located. The sensing data may include data which is sensed (or detected) by the first electronic devices 101-1, 101-2 at the place where the first electronic devices 101-1, 101-2 are located using at least one of one or more communication circuits or one or more sensors of the first electronic devices 101-1, 101-2. The sensing data may be data which is collected by using one or more of a cellular radio signal, a Wi-Fi signal, a BT signal, or an NFC signal, and other radio signals which are received at the place where the first electronic devices 101-1, 101-2 are located. The sensing data may be data which is included in a signal received from a device located (or disposed) inside the place where the first electronic device 101-1, 101-2 are located, a device (e.g., a base station) located in the proximity of the first electronic devices 101-1, 101-2, or a GPS satellite. The sensing data may be data on unique information of a device which transmits a signal. However, this should not be considered as limiting.

The sensing data may be data indicating environments where the first electronic devices 101-1, 101-2 are located.

When information on payment is received, the first electronic devices 101-1, 101-2 may extract POI information from the information on the payment. When the first electronic devices 101-1, 101-2 receive a message including a name of a store where payment is performed as the user performs mobile payment using the first electronic devices 101-1, 101-2 or performs payment using a credit card, the first electronic devices 101-1, 101-2 may extract the store name by parsing the message. The POI information extracted from the information on the payment will be referred to as primary POI information. The primary POI information may include information on a location where the first electronic devices 101-1, 101-2 receive a message.

The first electronic devices 101-1, 101-2 may transmit the primary POI information to the POI server 106-1 in order to obtain more exact POI information. When the primary POI information is received, the POI server 106-1 may determine reference POI information on the primary POI information. The reference POI information may include POI information which is popularly used. The reference POI information may include information on a name of a POI which is the most frequently used in a web site such as an Internet portal site. The reference POI information may include a name of a POI which is registered at a finance company, such as a card company. The reference POI information may include a name of a POI which is registered (business registration) at a national organization or a public institution. The reference POI information may be information on a place specified (or designated) for the place where the first electronic devices 101-1, 101-2 are located in order to distinguish the place where the first electronic devices 101-1, 101-2 are located from other places. The reference POI information may be information on a unique name of the place where the first electronic devices 101-1, 101-2 are located. The reference POI information may be a plurality of pieces of information. The same place may include a plurality of names like Olympic Park Store of Samsung Digital Plaza and Olympic Park of Samsung Digital Plaza. The reference POI information may be POI information which is matched with (or is mapped onto) sensing data received at the POI server 106-1 from the plurality of first electronic devices 101-1, 101-2, and stored.

The POI server 106-1 may search a database 106-2 to determine reference POI information on primary POI information. The POI server 106-1 may request a server which is provided by a third party like a server of a finance company to search for reference POI information.

When the POI server 106-1 determines the reference POI information on the primary POI information received from the electronic devices 101-1, 101-2, the POI server 106-1 may transmit the reference POI information to the electronic devices 101-1, 101-2. When the reference POI information is received from the POI server 106-1, the electronic devices 101-1, 101-2 may collect sensing data. The electronic devices 101-1, 101-2 may map the POI information and the collected sensing data and transmit the mapped sensing data and POI information to the POI server 106-1.

When the first electronic devices 101-1, 101-2 extract primary POI information from information on payment (or a result of payment), the first electronic devices 101-1, 101-2 may determine reference POI information from the extracted primary POI information. In the same or similar method as or to at least a portion of the operation of determining the reference POI information at the POI server 106-1, the first electronic devices 101-1, 101-2 may determine reference POI information based on at least a portion of the primary POI information. When the first electronic devices 101-1, 101-2 determine the reference POI information, the first electronic devices 101-1, 101-2 may collect sensing data. The first electronic devices 101-1, 101-2 may map the collected sensing data and the reference POI information and may transmit the mapped sensing data and reference POI information to the POI server 106-1.

When the electronic devices 101-1, 101-2 extract primary POI information from information on payment (or a result of payment), the electronic devices 101-1, 101-2 may collect sensing data and transmit the sensing data to the POI server 106-1 with the primary POI information (or at the same time as transmitting the primary POI information). The POI server 106-1 may determine reference POI information matching the primary POI information and the sensing data received from the electronic devices 101-1, 101-2. The POI server 106-1 may transmit the determined reference POI information to the electronic devices 101-1, 101-2.

When the electronic devices 101-1, 101-2 perform a payment operation, the electronic devices 101-1, 101-2 may transmit sensing data to the POI server 106-1. The POI server 106-1 may determine reference POI information matching the sensing data. The POI server 106-1 may transmit the determined reference POI information to the electronic devices 101-1, 101-2. The electronic devices 101-1, 101-2 may map the reference POI information received from the POI server and the sensing data, and may transmit the mapped reference POI information and sensing data to the POI server 106-1.

Although the database 106-2 is illustrated as a configuration independent from the POI server 106-1 in FIG. 6A, the database 106-2 may be included in the POI server 106-1.

FIG. 6B is a diagram of a method in which the POI server 106-1 receives sensing data from a second electronic device 101-3, and analyzes the received sensing data and provides POI information corresponding to (or matching) the sensing data to the second electronic device 101-3.

The second electronic device 101-3 may collect (or sense) sensing data at a place where the second electronic device 101-3 is located. The second electronic device 101-3 may collect sensing data using one or more of a cellular radio signal, a Wi-Fi signal, a BT signal, or an NFC signal, and other radio signals which are received at the place where the second electronic device 101-3 is located. However, the signal used to collect the sensing data is not limited to these signals.

The second electronic device 101-3 may collect sensing data by considering a movement state (or a user visit state) of the second electronic device 101-3 and a motion of the second electronic device 101-3. When the second electronic device 101-3 moves (e.g., when there is a change in the location of the second electronic device 101-3 (e.g., when there is a change in location data) and the second electronic device 101-3 makes a motion (e.g., when the second electronic device 101-3 rotates (e.g., when there is a change in data of a gyro sensor or the like), the second electronic device 101-3 may collect sensing data.

The second electronic device 101-3 may transmit the sensing data to the POI server 106-1 through the network 162.

The second electronic device 101-3 of FIG. 6B may be the same electronic device as the first electronic devices 101-1, 101-2 of FIG. 6A. The second electronic device 101-3 of FIG. 6B may be an electronic device different from the first electronic devices 101-1, 101-2 of FIG. 6A.

The POI server 106-1 may receive the sensing data from the second electronic device 101-3. When the sensing data is received from the second electronic device 101-3, the POI server 106-1 may search for reference POI information corresponding to (or matching) the sensing data. The POI server 106-1 may search for the same data as the sensing data through the database 106-2 and may search for reference POI information corresponding to (or mapped onto) the searched data.

The POI server 106-1 may transmit the searched reference POI information to the second electronic device 101-3.

The POI server 106-1 may transmit another information related to the searched reference POI information to the second electronic device 101-3. The POI server 106-1 may provide information on an event which is ongoing at the searched reference POI (e.g., a place where the second electronic device 101-3 is located) based on at least a portion of the searched reference POI information.

Although the database 106-2 is illustrated as a configuration independent from the POI server 106-1 in FIG. 6B, the database 106-2 may be included in the POI server 106-1.

Figure 7:
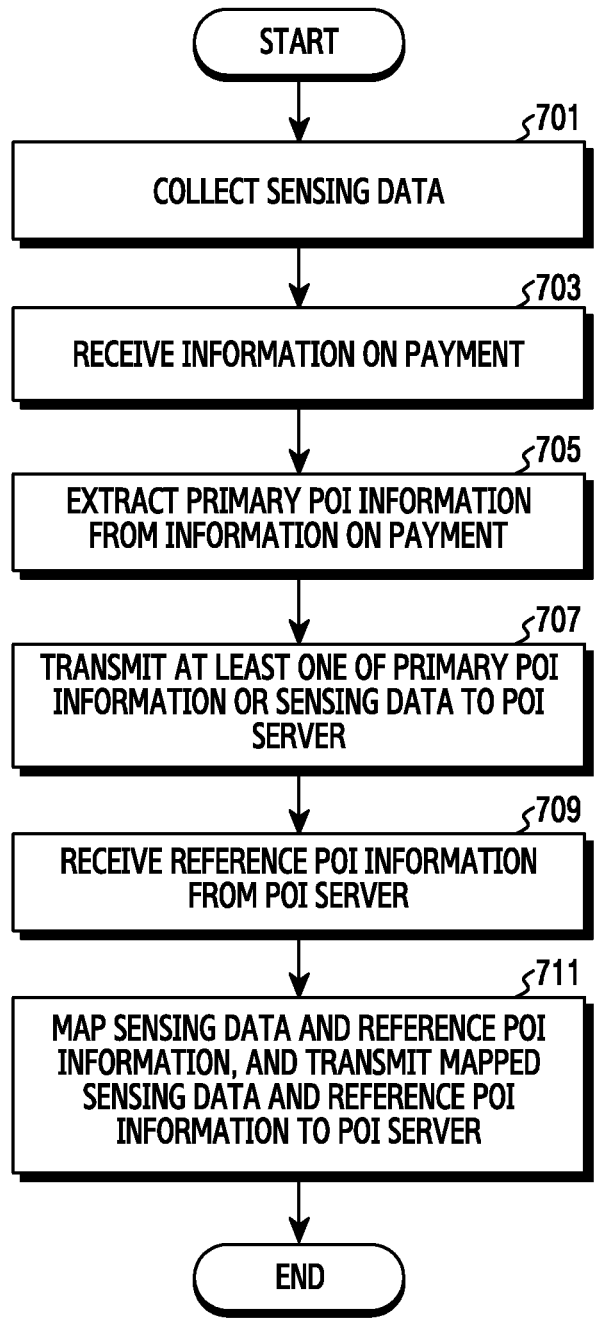
FIG. 7 is a flowchart of a method for providing POI information, according to an embodiment of the present disclosure.

FIG. 7 is a flowchart of a method for providing POI information, according to an embodiment of the present disclosure.

Referring to FIG. 7, in step 701, the electronic device 101 may collect data (hereinafter, referred to as sensing data) indicating at least a portion of a location of the electronic device 101.

The electronic device 101 may activate a device for collecting sensing data. The electronic device 101 may activate one or more of a plurality of wireless communication modules (e.g., the cellular module 221, the Wi-Fi module 222, the BT module 223, the BLE module 223-1, or the NFC module 225) or the sensor module 240 (e.g., a GPS sensor or the like) in order to collect sensing data.

The electronic device 101 may collect sensing data using at least one of the activated plurality of wireless communication modules or sensor module. The electronic device 101 may collect sensing data by receiving a signal from a device located (or disposed) inside a place where the electronic device 101 is located, a device (e.g., a base station) located in the proximity of the electronic device 101, or a GPS satellite. The sensing data may be data on unique information of a device which transmits a signal. The sensing data may include a media access control (MAC) address of the device.

The electronic device 101 may filter the sensing data. The electronic device 101 may store or delete a portion of the collected sensing data by considering an intensity of a signal including the sensing data or a type of the signal.

The electronic device 101 may temporarily store the sensing data. The electronic device 101 may delete at least a portion of previously stored sensing data at a time interval. The electronic device 101 may collect sensing data at a time interval (or on a predetermined cycle). When sensing data is newly collected, the electronic device 101 may delete previously stored data. When an input for collecting sensing data is detected (or a condition for collecting sensing data is satisfied) and new sensing data is collected, the electronic device 101 may delete previously stored sensing data.

Although step 701 of collecting sensing data precedes steps 703 to 709 in FIG. 7, this should not be considered as limiting. The operation of collecting sensing data may be performed in response to (or right after) step 703 of receiving or acquiring payment information. The step of collecting sensing data may be performed in response to (or right after) step 709 of receiving reference POI information.

In step 703, the electronic device 101 may receive information on payment.

The electronic device 101 may perform a payment operation using a mobile payment application.

The electronic device 101 may execute a mobile application (e.g., a Samsung pay application), and may perform communication for payment with an external electronic device using one of the wireless communication circuits while directly establishing wireless connection with the external electronic device (e.g., a POS) device. The electronic device 101 may transmit payment-related information to the external electronic device using one of NFC protocols, BT protocols, or MST protocols through one of the NFC module 225, the BT module 223, or the MST module 226. In addition to the communication method for payment, the electronic device 101 may use a non-communication method using a barcode or a QR code (quick response code) to transmit the payment-related information to the external electronic device. The payment-related information may include token information and/or encryption information (e.g., cryptogram). The electronic device 101 may perform a payment authentication operation to use a mobile payment service. The electronic device 101 may receive biometric information (e.g., fingerprint information or iris information), personal identification number (PIN) information, or a signature from the user, and may perform a payment authentication operation based on at least a portion of the received information prior to performing a payment operation. When the electronic device 101 uses a mobile payment service, the electronic device 101 may receive information on payment from a server (e.g., a payment server or a purchase server) providing a payment service. When mobile payment is performed or a payment authentication operation is performed before mobile payment is performed, the electronic device 101 may acquire information indicating that the payment or the payment authentication operation is performed. When the information indicating that the payment or payment authentication operation is performed is acquired, the electronic device 101 may activate at least one of the plurality of wireless communication circuits or sensors to collect sensing data. The electronic device 101 may collect sensing data using at least one of the activated plurality of wireless communication circuits or sensors.

When the user of the electronic device 101 performs payment using a card (e.g., a real credit card), the electronic device 101 may receive information on payment from a server (e.g., a server of a finance company). The electronic device 101 may receive the information on the payment (or a result of payment) in the form of a short message service (SMS), a long message service (LMS), or a multimedia SMS.

The electronic device 101 may directly receive the information on the payment from the payment server or finance server in step 703. The electronic device 101 may receive the information on the payment from the payment server or finance server through a location information service server, a marketing server, or the POI server 106-1.

In step 705, the electronic device 101 may extract primary POI information from at least a portion of the information on the payment.

When the user performs mobile payment using the electronic device 101, the electronic device 101 may receive information on payment from a mobile payment server (e.g., a server supporting the Samsung pay application). The electronic device 101 may extract primary POI information such as a name (or a store name or a name of a store) or a location of a store where payment is performed by parsing a text or an image indicating the result of payment.

The electronic device 101 may receive the information on the payment from a payment server of a credit card used for the payment (e.g., a server of a credit card company) in addition to the mobile payment server, and then may extract primary POI information by parsing the information on the payment.

When the user performs payment using a credit card, the electronic device 101 may extract primary POI information by parsing a message received as payment is performed.

When the electronic device 101 receives a message including the information on the payment, the electronic device 101 may extract information on a location where the message is received as primary POI information. The electronic device 101 may extract information on a location where the message is received as primary POI information by referring to a header portion of the message or based on information acquired through a location determination sensor (e.g., a GPS sensor) included in the electronic device 101 or received from a base station which transmits the message.

In step 707, the electronic device 101 may transmit at least one of the extracted primary POI information or the sensing data to the POI server 106-1.

When the primary POI information such as a name (or a store name or a name of a store) or a location of a store where payment is performed is extracted, the electronic device 101 may transmit the primary POI information to the POI server 106-1 using a communication module in order to acquire reference POI information from the POI server 106-1.

The electronic device 101 may transmit the sensing data to the POI server 106-1 with the primary POI information. The electronic device 101 may identify sensing data which is temporarily stored at the time of extracting the primary POI information, and may transmit the primary POI information and the sensing data to the POI server 106-1. The electronic device 101 may activate a module for collecting sensing data at the time of extracting the primary POI information or at the time of performing payment (e.g., at the time of receiving a result of payment), and may transmit the collected sensing data and the primary POI information to the POI server 106-1 using the activated module.

The electronic device 101 may transmit only the sensing data to the POI server 106-1 when the primary POI information is extracted.

In step 709, the electronic device 101 may receive reference POI information from the POI server 106-1.

When the POI server 106-1 receives only the primary POI information from the electronic device 101 without receiving sensing data, the POI server 106-1 may determine reference POI information on the primary POI information based on at least a portion of the primary POI information. The POI server 106-1 may receive, from the electronic device 101, information on a location where a message including a store name on a place of the electronic device 101 with a portion thereof being omitted and information on payment is received. The POI server 106-1 may determine, as reference POI information, the most similar store name to the store name with the portion thereof being omitted, received from the electronic device 101, from among store names located within a designated distance (e.g., 10 meter) from the location where the message is received. The POI server 106-1 may determine the same or most similar POI information as or to the primary POI information as reference POI information by searching the database 106-2, or may request a server provided by a third party (e.g., a web server or a finance company server) to search for more exact POI information regarding the primary POI information and may determine the POI information received from the server provided by the third party as reference POI information.

When the POI server 106-1 receives the primary POI information and the sensing data or receives only the sensing data from the electronic device 101, the POI server 106-1 may determine reference POI information by searching a database (e.g., a mapping DB) in which the POI information and the sensing data are mapped onto each other and stored. When the POI server 106-1 receives the primary POI information and the sensing data from the electronic device 101, the POI server 106-1 may search for data matching the primary POI information and the sensing data received from the electronic device 101 in the database (e.g., the mapping DB 540), and may determine POI information of the searched data as reference POI information.

When the POI server 106-1 receives only the sensing data from the electronic device 101, the POI server 106-1 may determine POI information mapped onto sensing data matching the sensing data received from the electronic device 101 in the database (e.g., the mapping DB) as reference POI information.

In step 711, the electronic device 101 may map the collected sensing data and the reference POI information received from the POI server 106-1 in step 709, and may transmit the mapped sensing data and reference POI information to the POI server 106-1.

When the electronic device 101 transmits only the primary POI information to the POI server 106-1 without sensing data and receives reference POI information from the POI server 106-1, the electronic device 101 may map sensing data which is temporarily stored at the time of receiving the reference POI information from the POI server 106-1, and the reference POI information, and may transmit the mapped sensing data and reference POI information to the POI server 106-1.

When the electronic device 101 transmits the primary POI information to the POI server 106-1 with the sensing data and receives reference POI information from the POI server 106-1, the electronic device 101 may map the sensing data and the reference POI information received from the POI server 106-1, and may transmit the mapped sensing data and reference POI information to the POI server 106-1. When the electronic device 101 transmits the primary POI information to the POI server 106-1 with the sensing data and receives reference POI information from the POI server 106-1, the electronic device 101 may map and store the sensing data and the reference POI information, and may not transmit the mapped sensing data and reference POI information to the POI server 106-1. When the POI server 106-1 receives the primary POI information from the electronic device 101 with the sensing data and determines reference POI information on the primary POI information, the POI server 106-1 may map and store the reference POI information determined at the POI server 106-1 and the sensing data although the POI server 106-1 does not receive mapped sensing data and reference POI information from the electronic device 101.

When the electronic device 101 transmits only the sensing data to the POI server 106-1 without primary POI information and receives reference POI information on the sensing data from the POI server 106-1, the electronic device 101 may map the sensing data and the reference POI information received from the POI server 106-1 and transmit the mapped sensing data and reference POI information to the POI server 106-1. Even when the electronic device 101 transmits only the sensing data to the POI server 106-1 and receives reference POI information from the POI server 106-1, the electronic device 101 may map the sensing data and the reference POI information and store the mapped sensing data and reference POI information, and may not transmit the mapped sensing data and reference POI information to the POI server 106-1, such as in the case when the electronic device 101 transmits the primary POI information to the POI server 106-1 with the sensing data and receives reference POI information from the POI server 106-1.

Although not illustrated in FIG. 7, the electronic device 101 may perform a portion of the functions performed at the POI server 106-1. The electronic device 101 may extract, as primary POI information from information on payment, information on a location where a message including a store name on a place of the electronic device 101 with a portion thereof being omitted and the information on the payment is received. The electronic device 101 may determine reference POI information based on at least a portion of the extracted information on the location where the message, including the store name on the place with the portion thereof being omitted and the information on the payment, is received, without transmitting at least one of the primary POI information and the sensing data to the POI server 106-1. When the electronic device 101 determines reference POI information, the electronic device 101 may map the sensing data and the reference POI information and store the mapped sensing data and reference POI information. The electronic device 101 may transmit the mapped sensing data and reference POI information to the POI server 106-1.

Figure 8:
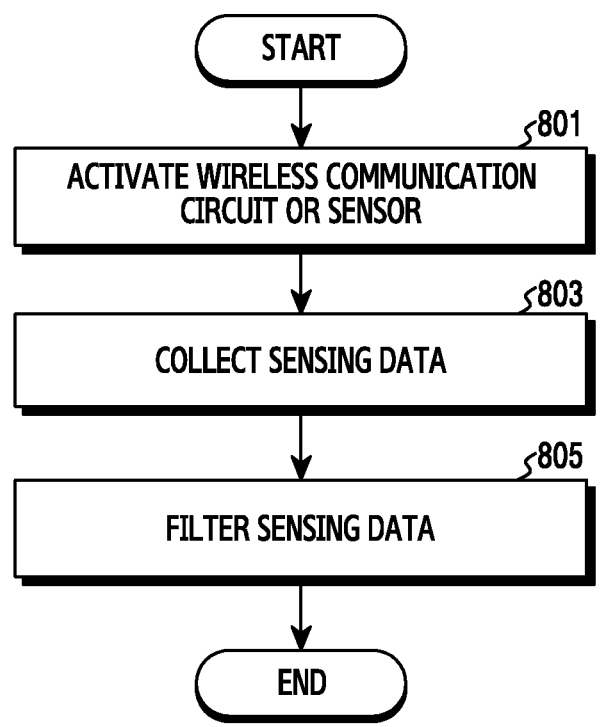
FIG. 8 is a flowchart of a method for collecting sensing data, according to an embodiment of the present disclosure.

FIG. 8 is a flowchart of a method for collecting sensing data, according to an embodiment of the present disclosure.

FIGS. 9A and 9B are diagrams of a method for collecting sensing data, according to an embodiment of the present disclosure.

Referring to FIG. 8 and FIGS. 9A and 9B, in step 801, the electronic device 101 may activate at least one of the wireless communication circuits or sensors in order to collect sensing data. The electronic device 101 may activate one or more of the plurality of wireless communication modules (e.g., the cellular module 221, the Wi-Fi module 222, the BT module 223, the BLE module 223-1, or the NFC module 225) or the sensor module (e.g., a GPS sensor or the like) in order to collect sensing data.

In step 803, the electronic device 101 may collect sensing data using at least one of the activated wireless communication circuits or sensor module.

The electronic device 101 may collect sensing data by receiving a signal from a device located (or disposed) inside a place where the electronic device 101 is located or a device (e.g., a base station) located in the proximity of the electronic device 101.

The sensing data may include unique information (e.g., a MAC address) of the device which transmits the signal. For example, as shown in FIG. 9A, the electronic device 101 may collect Wi-Fi address (00:23:DF:CE:2C:30, 00:14:CE:DF:KS:41) information at least based on Wi-Fi signals received from two Wi-Fi devices (e.g., Wi-Fi routers or Wi-Fi access points (APs)) disposed at the place where the electronic device 101 is located, and may collect BT address (BD) (DB:9E:3F:B4:A4:3E) information based on at least a portion of a Bluetooth signal received from a Bluetooth device.

The sensing data may further include information on a name (or a model name) of the device in addition to the unique information (e.g., a MAC address) of the device which transmits the signal. For example, as shown in FIG. 9A, the electronic device 101 may collect Wi-Fi address (00:23:DF:CE:2C:30, 00:14:CE:DF:KS:41) information and information on names of the devices (A coffee, ip-time) at least based on the Wi-Fi signals received from the two Wi-Fi devices disposed at the place where the electronic device 101 is located, and may further collect BT address (DB:9E:3F:B4:A4:3E) information and information on a name of the BT device (2pinz) based on at least a portion of the BT signal received from the BT device.

The electronic device 101 may collect sensing data by receiving a signal from a GPS satellite or the like. For example, as shown in FIG. 9B, the electronic device 101 may collect information on latitude (37.5003556) and longitude (127.0247803) corresponding to the location of the electronic device based on at least a portion of the signal received from the GPS satellite.

In step 805, the electronic device 101 may filter the sensing data.

The electronic device 101 may filter the sensing data based on at least a portion of an intensity of a signal including the sensing data. The electronic device 101 may receive a signal including sensing data from a device disposed at the place where the electronic device 101 is located. The electronic device 101 may not store a signal which has an intensity lower than or equal to a threshold value.

When the electronic device 101 temporarily stores the signal having the intensity less than or equal to the threshold value, the electronic device 101 may delete the temporarily stored signal. The electronic device 101 may measure quality of service (QoS) of the signal in addition to the intensity of the signal, and may filter the sensing data based on at least a portion of the measured quality of the signal. The electronic device 101 may filter the sensing data included in the signal based on a portion of at least one of a throughput, a transit delay, a residual error rate, or a priority. However, this should not be considered as limiting.

The electronic device 101 may filter the sensing data based on at least a portion of a type of the signal including the sensing data. The electronic device 101 may identify a type of a signal according to a distance to which the signal can be transmitted (or coverage of a signal), and may filter the sensing data included in the signal according to the type of the signal. When the signal including the sensing data corresponds to a short range wireless communication signal, the electronic device 101 may store (or collect) the signal including the sensing data, and may not store sensing data included in a wireless communication signal (e.g., WLAN or a wireless wide local area network (WWLAN)) which can be received at a longer distance than the short range wireless communication signal, or may temporarily store such sensing data and then delete it. However, this should not be considered as limiting.

The electronic device 101 may identify a type of a signal according to mobility of a device which transmits the signal including sensing data, and may filter the sensing data included in the signal according to the type of the signal. For example, when the electronic device 101 receives signals including sensing data from a BLE device (or a beacon device) and a BT device, the electronic device 101 may not store sensing data included in the signal received from the BT device which has stronger mobility than the BLE device, or may temporarily store such sensing data and then delete it, and may store (or collect) only the sensing data included in the signal received from the BLE device. Since the BLE device may be disposed at a specific place (or a fixed place) and the BT device may be included in the electronic device 101 (or mobile communication device), it may be deemed that the BT device has stronger mobility than the BLE device. The electronic device 101 may acquire more exact information on the place where the electronic device 101 is located based on at least a portion of the sensing data included in the signal received from the BLE device than based on the Bluetooth device.

Figure 10:
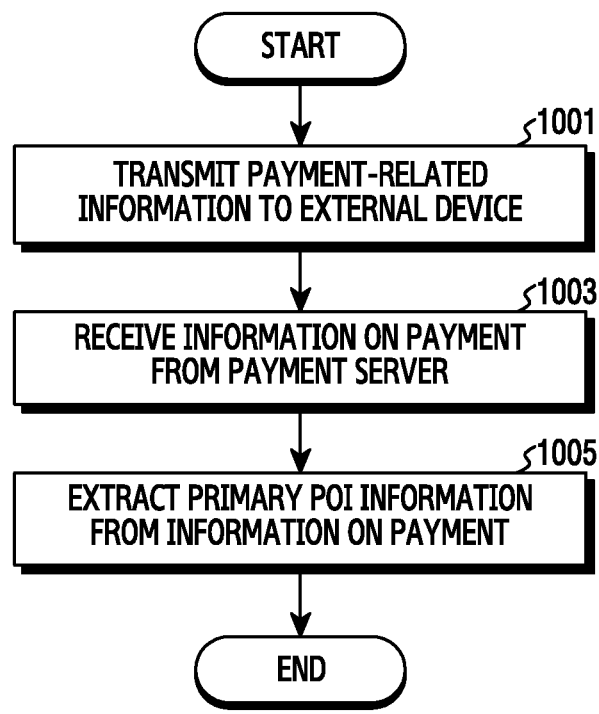
FIG. 10 is a flowchart of a method for extracting primary POI information from payment information, according to an embodiment of the present disclosure.

FIG. 10 is a flowchart of a method for extracting primary POI information from payment information, according to an embodiment of the present disclosure.

Figure 11:
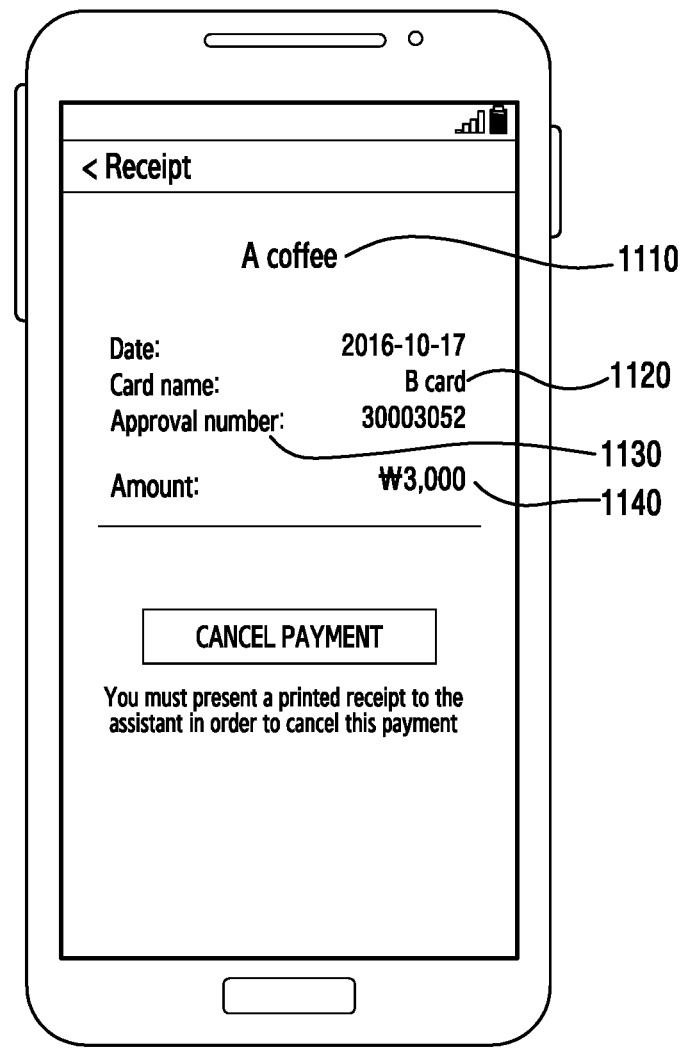
FIG. 11 is a diagram of a method for extracting primary POI information from payment information, according to an embodiment of the present disclosure.

FIG. 11 is a diagram of a method for extracting primary POI information from payment information, according to an embodiment of the present disclosure.

FIGS. 10 and 11 may be views to illustrate a method for receiving or acquiring information on payment using a mobile payment service.

Referring to FIGS. 10 and 11, in step 1001, the electronic device 101 may transmit payment-related information to an external electronic device (e.g., a POS device).

The electronic device 101 may perform a payment operation using a mobile payment application. The electronic device 101 may execute a mobile application (e.g., a Samsung pay application), and may perform communication for payment with an external electronic device within a selected distance range using one of the wireless communication circuits while directly establishing wireless connection with the external electronic device. The electronic device 101 may transmit the payment-related information to the external electronic device using one of NFC protocols, BT protocols, or MST protocols through one of the NFC module 225, the BT module 223, or the MST module 226. The communication method for payment may include a barcode or a QR code. The payment-related information may include token information and/or encryption information (e.g., cryptogram).

The electronic device 101 may further perform a payment authentication operation to use a mobile payment service. The electronic device 101 may receive biometric information (e.g., fingerprint information or iris information), PIN information, or a signature from the user, and may perform the payment authentication operation based on at least a portion of the received information prior to performing the payment operation.

In step 1003, the electronic device 101 may receive information on payment (or a result of payment) from a payment server (or a purchase server or the like).

The electronic device 101 may receive information on payment from the payment server as shown in FIG. 11.

In step 1005, the electronic device 101 may extract primary POI information based on at least a portion of the information on the payment.

The electronic device 101 may extract information on a place corresponding to a location where the payment operation is performed (or a place where payment is performed) from the information on the payment. In FIG. 11, the electronic device 101 may extract information on a name 1110 of a store (or a store name or a name of a store) (e.g., A coffee) where payment is performed as information on a place corresponding to a location where the payment operation is performed. The electronic device may further extract at least one of a name 1120 (B card name) of a finance company related to payment (or a finance company approving payment) (e.g., a credit card company or the like), an approval number 1130, or a payment amount 1140, in addition to the information on the place corresponding to the location where the payment operation is performed.

Figure 12:
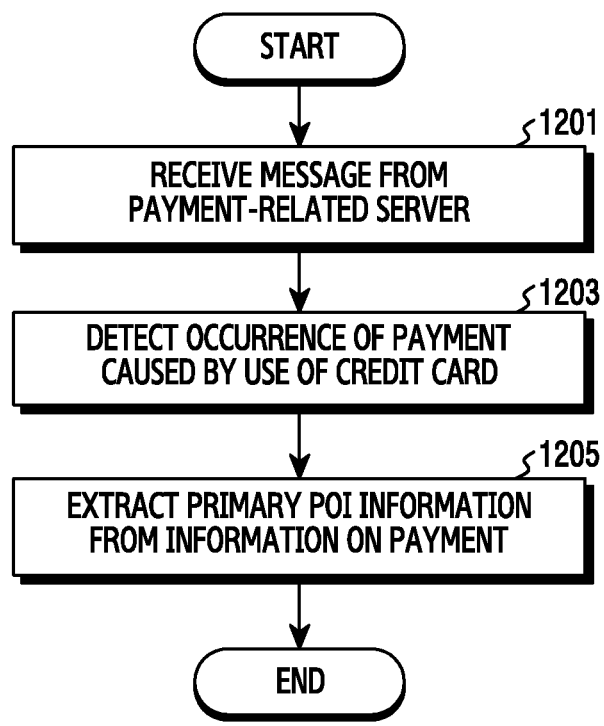
FIG. 12 is a flowchart of a method for extracting primary POI information from payment information, according to an embodiment of the present disclosure.

FIG. 12 is a flowchart of a method for extracting primary POI information from payment information, according to an embodiment of the present disclosure.

Figure 13:
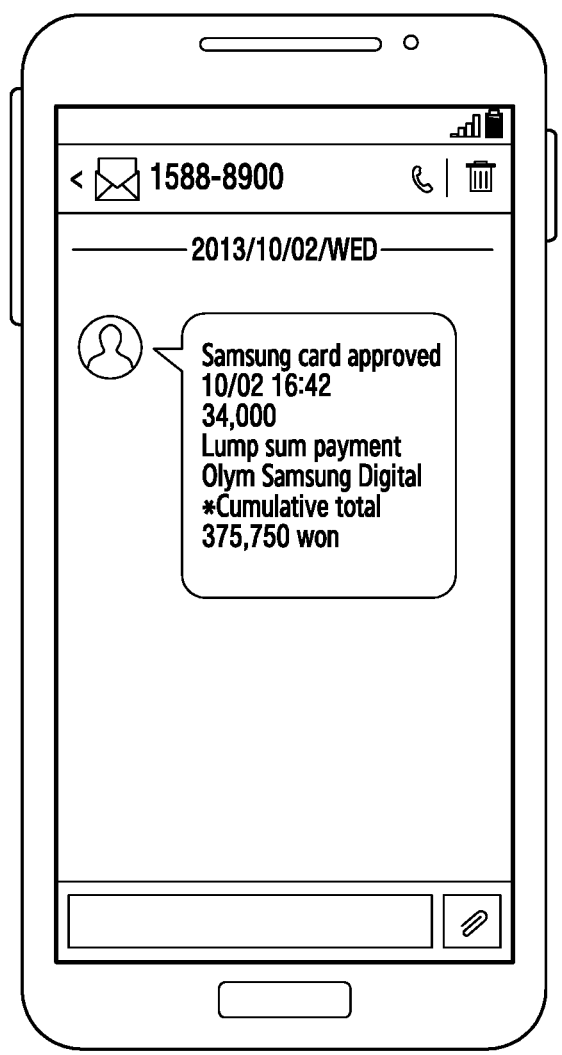
FIG. 13 is a diagram of a method for extracting primary POI information from payment information, according to an embodiment of the present disclosure.

FIG. 13 is a diagram of a method for extracting primary POI information from payment information, according to an embodiment of the present disclosure. For example, FIG. 13 illustrates a screen displaying a message including information on payment when the user performs payment.

FIGS. 12 and 13 may be views to illustrate a method for extracting primary POI information from payment information when the user performs payment using a card (e.g., a credit card or the like).

In step 1201, the electronic device 101 may receive a message from a payment-related server. The electronic device 101 may receive various messages in the form of an SMS, an LMS, or a multimedia SMS. The electronic device 101 may receive messages in the form of an email or a messenger.

In step 1203, the electronic device 101 may detect that payment is made by use of a credit card based on at least a portion of the received message.

The electronic device 101 may detect (or determine) information indicating that the user performs payment by parsing the received message. The electronic device 101 may determine that the received message is a payment-related message by parsing the message. When the message includes a name of a finance company which processes the payment, the electronic device 101 may determine that the received message is a payment-related message. As shown in FIG. 13, the electronic device 101 may extract the name of the finance company which processes payment like Samsung card from the received message, and may determine that the received message is a payment-related message based on at least a portion of the extracted name of the finance company. When the message includes a term related to payment processing (e.g., approval, cancel payment, or lump sum payment), the electronic device 101 may determine that the received message is a payment-related message. As shown in FIG. 13, the electronic device 101 may extract a term related to payment processing such as approval or lump sum payment in the received message, and may determine that the received message is a payment-related message based on at least a portion of the extracted payment processing term. When the message includes information related to a place where the payment is performed, the electronic device 101 may determine that the received message is a payment-related message. As shown in FIG. 13, the electronic device 101 may extract information on the place where payment is performed like Olym Samsung Digital or contact information of the place where payment is performed like 1588-8900 from the received message, and may determine that the received message is a payment-related message based on at least a portion of the information on the place where the payment is performed.

When the message includes information on a payment amount, the electronic device 101 may determine that the received message is a payment-related message. As shown in FIG. 13, the electronic device 101 may extract information on an amount of currently paid money like 34,000 won or information on a cumulative amount of paid money like Cumulative total 375,750 won from the received message, and may determine that the received message is a payment-related message based on at least a portion of the extracted payment processing term.

In step 1205, the electronic device 101 may extract primary POI information from payment information. When it is detected that the received message is the payment-related message by parsing the received message in step 1203, the electronic device 101 may extract information on the place where the payment is performed as primary POI information included in the payment-related message. The electronic device 101 may further extract additional information related to payment such as at least one of the name of the finance company which processes the payment, the term related to payment processing, or the information on the payment amount. The electronic device 101 may further extract a variety of information such as a category of a service provided at the place where the payment is performed, an address of the place where the payment is performed, or a uniform resource locator (URL) related to payment or the place where the payment is performed.

When the URL related to the place where the payment is performed is included in the message, the electronic device 101 may connect to (or access) a web site corresponding to the URL, and may further acquire, from the connected web site, a variety of information such as the name of the finance company which processes the payment, the term related to the payment processing, the information on the place where the payment is performed, the information on the payment amount, or an event which is ongoing at the place where the payment is performed.

FIGS. 14A to 14C are diagrams of a method for mapping sensing data and POI information in the electronic device, according to an embodiment of the present disclosure.

Referring to FIGS. 14A to 14C, the electronic device 101 may perform an operation of matching (or mapping) sensing data and POI information. The electronic device 101 may match (or map) sensing data and primary POI information or reference POI information before transmitting temporarily stored sensing data and primary POI information to the POI server 106-1 or after receiving reference POI information from the POI server 106-1.

FIG. 14A illustrates primary POI information (or POI data) which is acquired at a place where the electronic device 101 is located. The primary POI information may include information on at least one of a name (Gangnam, A coffee) of the place where the electronic device 101 is located and the location of the place where the electronic device 101 is located, or information on the location of the electronic device 101. The information on the location of the electronic device 101 may be received from a GPS satellite, and may include information on latitude (37.5003556) and longitude (127.0247803).

FIG. 14B illustrates sensing data (or sensor data) which is included in a signal received from a device located (or disposed) inside the place where the electronic device 101 is located or from a device (e.g., a base station) located in the proximity of the electronic device 101. The sensing data may include a Wi-Fi address (00:23:DF:CE:2C:30, 00:14:CE:DF:KS:41) included in a Wi-Fi signal received from a Wi-Fi device (e.g., a Wi-Fi router or a Wi-Fi AP) disposed at the place where the electronic device 101 is located, and BT address (BD) (DB:9E:3F:B4:A4:3E) information included in a BT signal received from a Bluetooth device. The sensing data may include unique information (e.g., MAC address information or the like of a device) of a device which transmits a signal. The sensing data may further include a name of the device (A coffee, ip-time, or 2pinz) in addition to the unique information of the device which transmits the signal. The sensing data may further include information on a type of the device (e.g., Wi-Fi or BT).

FIG. 14C illustrates a database of the electronic device 101 in which sensing data and POI information mapped onto each other are stored. The electronic device 101 may map information on the name (e.g., Gangnam, A coffee) and the location (e.g., latitude (37.5003556) and longitude (127.0247803)) of the place where the electronic device 101 is located, as primary POI information, onto the collected sensing data (e.g., at least one of the unique information of the device (00:23:DF:CE:2C:30, 00:14:CE:DF:KS:41, DB:9E:3F:B4:A4:3E), the name of the device (A coffee, ip-time, or 2pinz), or the type of the device (e.g., Wi-Fi or BT)).

The electronic device 101 may map temporarily stored sensing data and primary POI information (or reference POI information) and store the mapped sensing data and primary POI information, and may transmit the stored sensing data and primary POI information (or reference POI information) to the POI server 106-1.

Figure 15:
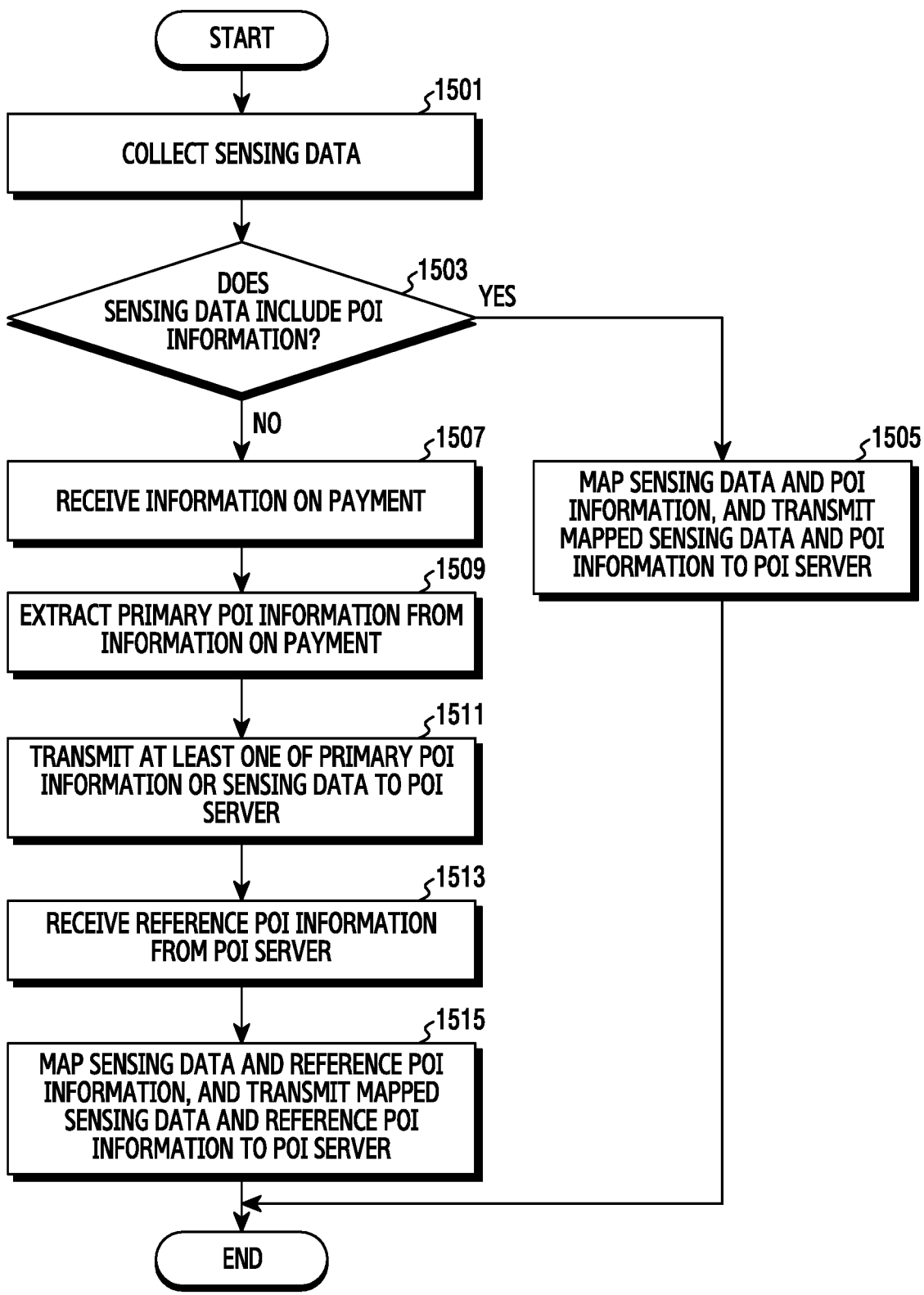
FIG. 15 is a flowchart of a method for providing POI information, according to an embodiment of the present disclosure.

FIG. 15 is a flowchart of a method for providing POI information, according to an embodiment of the present disclosure.

FIG. 15 is a view to illustrate a method for providing POI information by receiving or acquiring POI information as well as sensing data from a device disposed at a place where the electronic device 101 is located.

In step 1501, the electronic device 101 may collect sensing data, which is the same as or similar to the step 701 of collecting sensing data in FIG. 7 at least in part, and thus a detailed description thereof is omitted.

In step 1503, the electronic device 101 may determine whether the sensing data includes POI information.

When the electronic device 101 is located at a specific place (e.g., a store, or when the electronic device 101 approaches the store), the electronic device 101 may further receive POI information (e.g., information related to the specific place) in addition to unique information of a beacon device (e.g., MAC address information of a beacon device) from the beacon device (e.g., a BLE device) disposed at the specific place. The electronic device 101 may receive a beacon signal including information on a name of the specific place and a service provided at the specific place (e.g., a menu or an event provided at the specific place) from the beacon device. The device which transmits the unique information thereof and the POI information is not limited to the beacon device, and the electronic device 101 may receive or acquire unique information of a device and POI information through various devices. The electronic device 101 may analyze the beacon signal and determine whether the sensing data includes POI information. When the sensing data includes the name of the specific place or the like, the electronic device 101 may determine that the sensing data includes POI information. However, this should not be considered as limiting.

In step 1503, when it is determined that the sensing data includes POI information, the electronic device 101 may map the sensing data and the POI information and transmit the mapped sensing data and POI information to the POI server 106-1 in step 1505.

In step 1503, when it is determined that the sensing data does not include POI information, the electronic device 101 may perform an operation of receiving information on payment in step 1507.

Steps 1507 to 1515 of FIG. 15 are the same as or similar to steps 703 to 711 of FIG. 7 at least in part, and thus a detailed description thereof is omitted.

Figure 16:
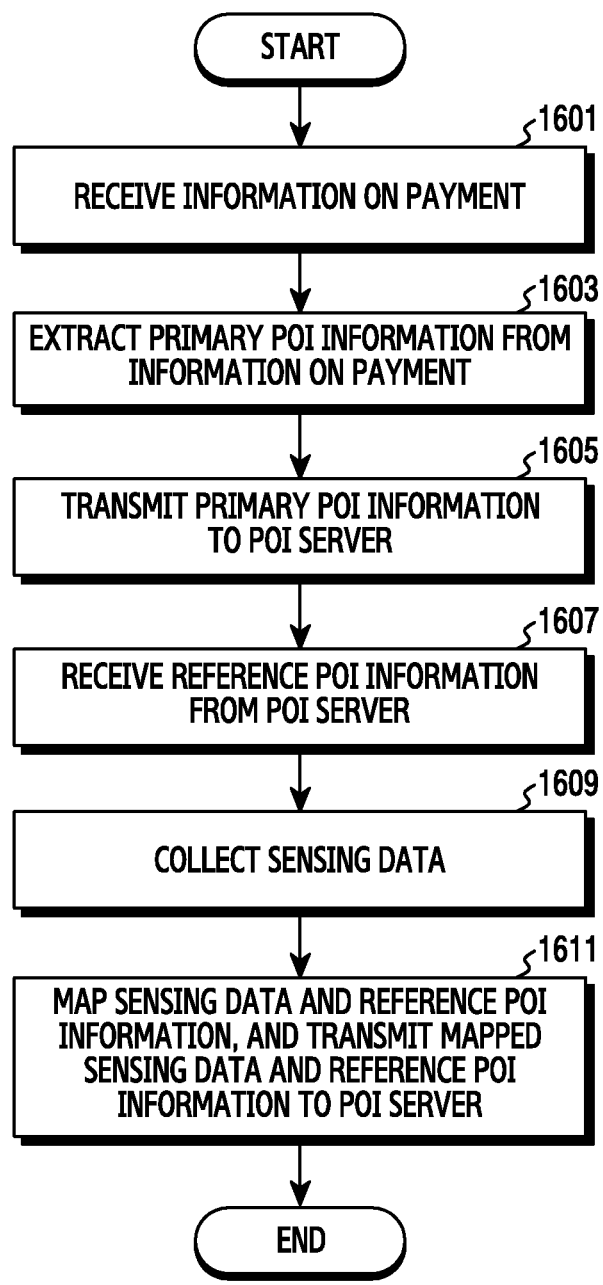
FIG. 16 is a flowchart of a method for providing POI information, according to an embodiment of the present disclosure.

FIG. 16 is a flowchart of a method for providing POI information, according to an embodiment of the present disclosure.

Referring to FIG. 16, in step 1601, the electronic device 101 may receive information on payment.

The electronic device 101 may execute a mobile application (e.g., a Samsung pay application), and may perform communication for payment with an external electronic device using one of the wireless communication circuits while directly establishing wireless connection to the external electronic device (e.g., a POS device). When the electronic device 101 uses a mobile payment service, the electronic device 101 may receive information on payment from a server providing a payment service (e.g., a payment server or a purchase server).

When the user of the electronic device 101 performs payment using a card (e.g., a real credit card, a virtual or electronic credit card, or the like), the electronic device 101 may receive information on payment from a server (e.g., a server of a finance company). The electronic device 101 may receive the information on the payment (or a result of payment) in the form of an SMS, an LMS, or a multimedia SMS.

In step 1603, the electronic device 101 may extract primary POI information from at least a portion of the information on the payment.

When the user performs mobile payment using the electronic device 101, the electronic device 101 may receive information on payment from a mobile payment server (e.g., a server supporting the Samsung pay application). The electronic device 101 may extract primary POI information such as a name (or a store name or a name of a store) or a location of a store where payment is performed by parsing a text or an image indicating the result of payment.

When the user performs payment using a credit card, the electronic device 101 may extract primary POI information by parsing a message or the like received as the payment is performed.

When the electronic device 101 receives a message including the information on the payment, the electronic device 101 may extract information on a location where the message is received as primary POI information. The electronic device 101 may extract the information on the location where the message is received, as primary POI information, by referring to a header portion of the message or based on information acquired through a location determination sensor (e.g., a GPS sensor) included in the electronic device 101 or received from a base station which transmits the message.

In step 1605, the electronic device 101 may transmit the extracted primary POI information to the POI server 106-1.

When the primary POI information such as the name (or a store name or a name of a store) or the location of the store where the payment is performed is extracted, the electronic device 101 may transmit the primary POI information to the POI server 106-1 using a communication module in order to acquire reference POI information from the POI server 106-1.

In step 1607, the electronic device 101 may receive reference POI information from the POI server 106-1.

When the POI server 106-1 receives the primary POI information from the electronic device 101, the POI server 106-1 may determine reference POI information on the primary POI information based on at least a portion of the primary POI information. The POI server 106-1 may receive, from the electronic device 101, information on a location where a message including a store name with a portion thereof being omitted and information on payment is received. The POI server 106-1 may determine, as reference POI information, the most similar store name to the store name with the portion thereof being omitted, received from the electronic device 101, from among store names located within a designated distance (e.g., 10 meter) from the location where the message is received. The POI server 106-1 may determine POI information that is the same as or most similar to the primary POI information as reference POI information by searching the database, or may request a server provided by a third party (e.g., a web server or a finance company server) to search for more exact POI information on the primary POI information and may determine POI information received from the server provided by the third party as reference POI information.

In step 1609, the electronic device 101 may collect sensing data.

When the reference POI information is received, the electronic device 101 may activate a device for collecting sensing data. The electronic device 101 may activate one or more of a plurality of wireless communication modules (e.g., the cellular module 221, the Wi-Fi module 222, the BT module 223, the BLE module 223-1, or the NFC module 225) or the sensor module 240 (e.g., a GPS module) in order to collect sensing data.

The electronic device 101 may collect sensing data using at least one of the activated plurality of wireless communication modules or sensor module. The electronic device 101 may collect sensing data by receiving a signal from a device located (or disposed) inside the place where the electronic device 101 is located, a device (e.g., a base station) located in the proximity of the electronic device 101, or a GPS satellite. The sensing data may be data on unique information of the device which transmits the signal. For example, the sensing data may include a MAC address of the device.

In step 1611, the electronic device 101 may map the sensing data collected in step 1609 and the reference POI information received from the POI server 106-1 in step 1607, and may transmit the mapped sensing data and reference POI information to the POI server 106-1. The electronic device 101 may store the mapped sensing data and reference POI information in the memory 130.

Figure 17:
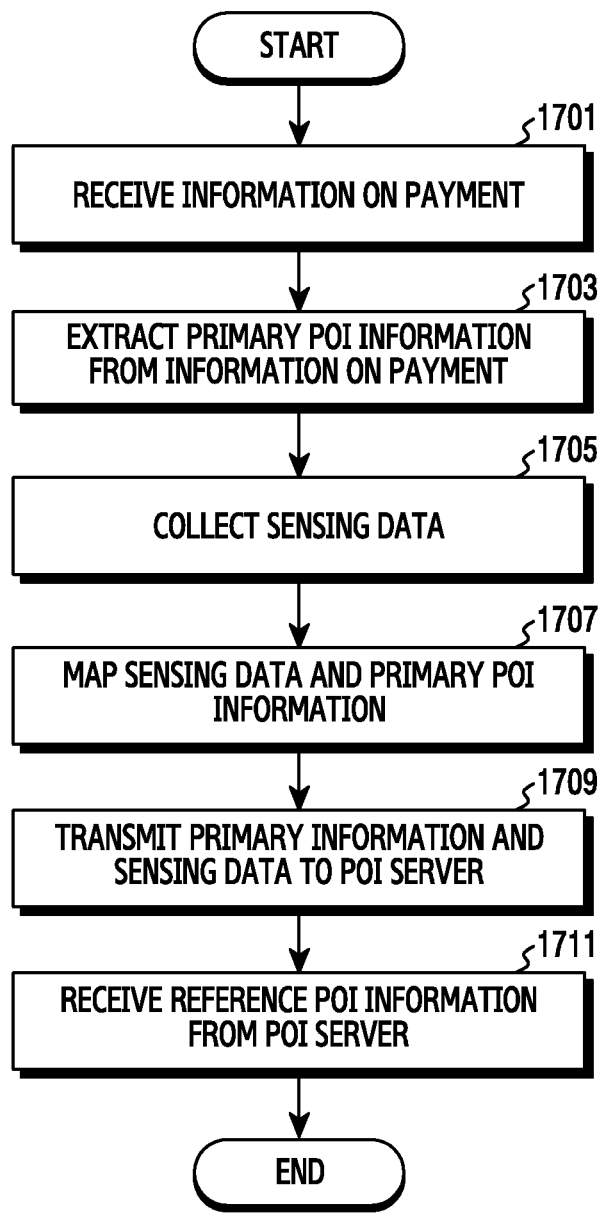
FIG. 17 is a flowchart of a method for providing POI information, according to an embodiment of the present disclosure.

FIG. 17 is a flowchart of a method for providing POI information, according to an embodiment of the present disclosure.

Referring to FIG. 17, in step 1701, the electronic device 101 may receive information on payment.

The electronic device 101 may execute a mobile application (e.g., a Samsung pay application), and may perform communication for payment with an external electronic device using one of the wireless communication circuits while directly establishing wireless connection to the external electronic device (e.g., a POS device). When the electronic device 101 uses a mobile payment service, the electronic device 101 may receive information on payment from a server providing a payment service (e.g., a payment server or a purchase server).

When the user of the electronic device 101 performs payment using a card (e.g., a real credit card, an electronic credit card, or the like), the electronic device 101 may receive information on payment from a server (e.g., a server of a finance company). The electronic device 101 may receive the information on the payment (or a result of payment) in the form of an SMS, an LMS, or a multimedia SMS.

In step 1703, the electronic device 101 may extract primary POI information from at least a portion of the information on the payment.

When the user performs mobile payment using the electronic device 101, the electronic device 101 may receive information on payment from a mobile payment server (e.g., a server supporting the Samsung pay application). The electronic device 101 may extract primary POI information such as a name (or a store name or a name of a store) or a location of a store where payment is performed by parsing a text or an image indicating the result of payment.

After receiving the information on the payment from a payment server of the credit card (e.g., a server of a credit card company) used for mobile payment, in addition to from the mobile payment server, the electronic device 101 may extract the primary POI information by parsing the information on the payment.

When the user performs payment using a credit card, the electronic device 101 may extract the primary POI information by parsing a message or the like received as the payment is performed.

When the electronic device 101 receives a message including the information on the payment, the electronic device 101 may extract information on a location where the message is received as primary POI information. The electronic device 101 may extract the information on the location where the message is received, as primary POI information, by referring to a header portion of the message or based on information acquired through a location determination sensor (e.g., a GPS sensor) included in the electronic device 101 or received from a base station which transmits the message.

In step 1705, when the primary POI information is extracted, the electronic device 101 may collect sensing data.

The electronic device 101 may activate a device for collecting sensing data. The electronic device 101 may activate one or more of a plurality of wireless communication modules (e.g., the cellular module 221, the Wi-Fi module 222, the BT module 223, the BLE module 223-1, or the NFC module 225) or the sensor module 240 (e.g., a GPS module) in order to collect sensing data.

The electronic device 101 may collect sensing data using at least one of the activated plurality of wireless communication modules or sensor module. The electronic device 101 may collect sensing data by receiving a signal from a device located (or disposed) inside the place where the electronic device 101 is located, a device (e.g., a base station) located in the proximity of the electronic device 101, or a GPS satellite. The sensing data may be data on unique information of the device which transmits the signal. The sensing data may include a MAC address of the device.

In step 1707, the electronic device 101 may map the primary POI information extracted in step 1703 and the sensing data collected in step 1705. Step 1707 of mapping the primary POI information and the sensing data may be omitted.

In step 1709, the electronic device 101 may transmit the mapped primary POI information and sensing data to the POI server 106-1. When the electronic device 101 does not map the primary POI information and the sensing data in step 1707, the electronic device 101 may transmit the primary POI information extracted in step 1703 and the sensing data collected in step 1705 to the POI server 106-1 without performing the mapping operation.

In step 1711, the electronic device 101 may receive reference POI information from the POI server 106-1.

When the POI server 106-1 receives the primary POI information and the sensing data from the electronic device 101, the POI server 106-1 may determine reference POI information by searching a database (e.g., a mapping DB) in which POI information and sensing data are mapped onto each other and stored. When the POI server 106-1 receives the primary POI information and the sensing data from the electronic device 101, the POI server 106-1 may search for data matching the primary POI information and the sensing data which are received from the electronic device 101 from the database (e.g., a mapping DB), and may determine POI information of the searched data as reference POI information.

When the electronic device 101 receives the reference POI information from the POI server 106-1, the electronic device 101 may store the received reference POI information in the memory 130.

Figure 18:
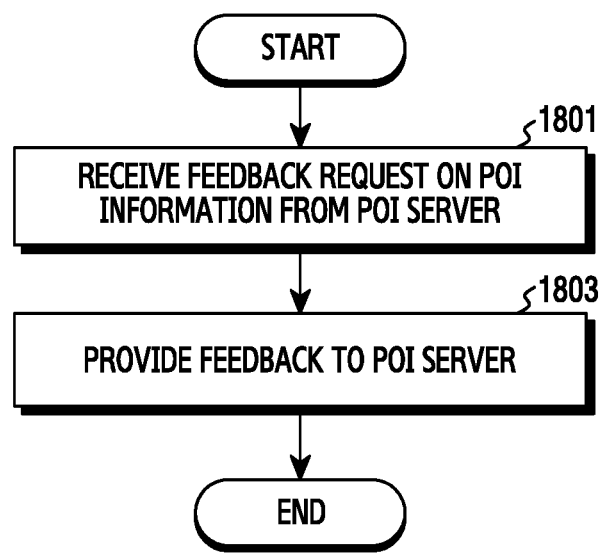
FIG. 18 is a flowchart of a method for providing feedback on POI information in an electronic device, according to an embodiment of the present disclosure.

FIG. 18 is a flowchart of a method for providing feedback on POI information in the electronic device, according to an embodiment of the present disclosure.

Referring to FIG. 18, in step 1801, the electronic device 101 may receive a feedback request on POI information from the POI server 106-1.

When the POI server 106-1 is not able to search for reference POI information based on at least a portion of the primary POI information and the sensing data which are received from the electronic device 101, the POI server 106-1 may request feedback on the POI information from the electronic device 101.

When the POI server 106-1 receives information on a name of the place where the electronic device 101 is located (e.g., Olympic Store of Samsung Digital Plaza) with a portion thereof being omitted (e.g., Samsung Digital Plaza) from the electronic device 101, and is not able to search for the exact name of the place (or reference POI) based on at least a portion of the name of the place with the portion thereof being omitted, the POI server 106-1 may request the electronic device 101 to transmit the exact name of the place (or reference POI).

The POI server 106-1 may receive the POI information from the electronic device 101 with the sensing data (e.g., unique information of a device disposed at the place where the electronic device 101 is located). The POI server 106-1 may search for the same data as the received sensing data from among sensing data stored in the database. When POI information mapped onto the searched sensing data and stored is not identical to the POI information received from the electronic device 101, the POI server 106-1 may request feedback from the electronic device 101.

The feedback request on the POI information received from the POI server 106-1 may include information on a candidate POI. The POI server 106-1 may determine (or extract) a candidate POI on reference POI based on at least a portion of the POI information received from the electronic device 101, and may transmit information on the candidate POI to the electronic device 101. The POI server 106-1 may receive information on the name of the place where the electronic device 101 is located (e.g., Olympic Store of Samsung Digital Plaza) with a portion thereof being omitted (e.g., Samsung Digital Plaza) from the electronic device 101. The POI server 106-1 may determine, as candidate POIs, names of places which are located within a designated radius from the location of the electronic device 101, such as names of candidate places regarding the name of the place where the electronic device 101 is located (e.g., Cheonho Store of Samsung Digital Plaza," Olympic Store of Samsung Digital Plaza, or Dunchon-dong Store of Samsung Digital Plaza), or the name (e.g., Olympic Store of Samsung Digital Plaza) including the name of the place with a portion thereof being omitted (e.g., Olym of Samsung Digital Plaza). When the candidate POI is determined, the POI server 106-1 may transmit information on the candidate POI to the electronic device 101.

In step 1803, the electronic device 101 may provide feedback on the POI information to the POI server. The electronic device 101 may provide POI information to the POI server 106-1 based on at least a portion of an input received from the user. When the candidate POI information is received from the POI server, the electronic device 101 may output the candidate POI information through the display 160. When an input of selecting one piece of POI information from the candidate POI information is received from the user, the electronic device 101 may transmit the selected POI information to the POI server 106-1. The electronic device 101 may display a UI for searching for POI information using the display 160 in order for the user to search for POI information. When POI information is searched or inputted by the user, the electronic device 101 may transmit the searched or inputted POI information to the POI server 106-1.

Figure 19:
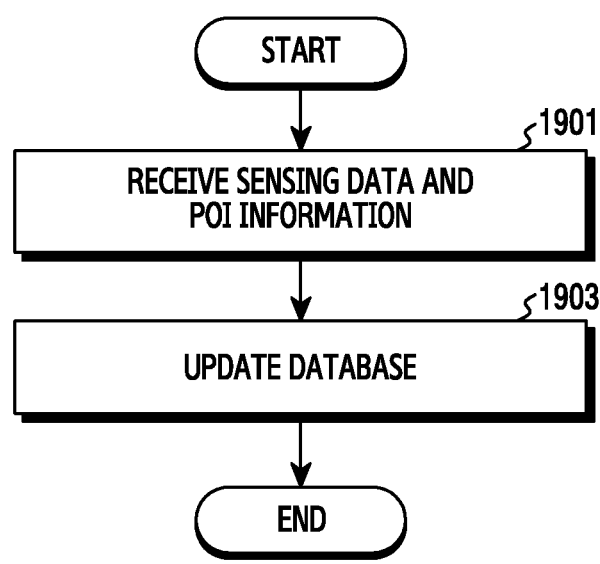
FIG. 19 is a flowchart of a method for establishing a system for providing POI information in a POI server, according to an embodiment of the present disclosure.

FIG. 19 is a flowchart of a method for establishing a system for providing POI information in the POI server, according to an embodiment of the present disclosure.

FIGS. 20A to 20C are diagrams of a method for establishing a system for providing POI information in the POI server, according to an embodiment of the present disclosure.

Referring to FIG. 19 and FIGS. 20A to 20C, in step 1901, the POI server 106-1 may receive sensing data which is sensed at a plurality of electronic devices and POI information (e.g., primary POI information) from the plurality of electronic devices. As shown in FIG. 20A, the POI server 106-1 may receive POI information (e.g., information on a name of a place where the electronic device 101 is located (Gangnam, A coffee) or information on latitude (37.5003556) and longitude (127.0247803)) from the electronic device 101. As shown in FIG. 20B, the POI server 106-1 may receive a plurality of sensing data collected at the same place from the electronic device 101. The plurality of sensing data transmitted to the POI server 106-1 in FIG. 20B may include: Wi-Fi device information (X: xxx2, Y: yyy1, Z: zzz2, and X: xxx2, Y: yyy2, Z: zzz2) included in signals received from two Wi-Fi devices; BT device information (A: aaa1, B: bbb2, C: ccc2, and A: aaa2, B: bbb2, C: ccc2)

included in signals received from BT devices; information of AP included in signals received from two LTE APs (D: ddd1, E: eee1, F: fff1, G: ggg1, H: hhh1, and D: ddd2, E: eee2, F: fff2, G: ggg2, H: hhh2); and NFC device information (I: iii1, J: jjj1, K: kkk1, and I: iii2, J: jjj2, K: kkk2) included in signals received from two NFC devices. The POI server 106-1 may receive sensing data from the electronic device 101 at a time interval (or on a designated cycle).

When the sensing data and the POI information (e.g., primary POI information) are received, the POI server 106-1 may match (or map) the sensing data and the POI information and store the mapped sensing data and POI information in the database 106-2. When the sensing data and the POI information are received, the POI server 106-1 may identify (or classify) the sensing data according to a POI, may match the identified sensing data according to POI information, and may store the matched sensing data and POI information in the database 106-2. FIG. 20C, the POI server 106-1 may store sensing data received from the electronic device 101 with respect to three POIs.

While storing the sensing data and the POI information, the POI server 106-1 may perform a filtering operation with respect to the sensing data. The POI server 106-1 may perform the filtering operation with respect to the sensing data based on the sensing data received from the electronic device 101, e.g., at least one of an intensity of a signal including the sensing data when the sensing data is collected, QoS of the signal, or a type of the signal. The POI server 106-1 may not store sensing data (or may delete sensing data) included in a signal when the intensity of the signal including the sensing data when the sensing data is collected is less than or equal to a threshold value. The POI server 106-1 may measure the QoS of a signal including sensing data when collecting the sensing data, and may not store sensing data included in a signal when the measured QoS of the signal (e.g., a throughput, a transit delay, a residual error rate, or a priority) is less than or equal to a designated quality. The POI server 106-1 may store sensing data on a radio signal when the range of wireless coverage of the signal including the sensing data is narrow. Only when the signal including the sensing data is a short range communication signal when the sensing data is collected, the POI server 106-1 may store the sensing data. When the signal including the sensing data when the sensing data is collected is a wireless communication signal having strong mobility, the POI server 106-1 may not store the sensing data included in the wireless communication signal having storing mobility (e.g., a BT signal or the like).

In step 1903, the POI server 106-1 may update the database 106-2 based on at least a portion of the sensing data or the POI information received in step 1901. The POI server 106-1 may update the POI information and the sensing data which are stored in the database 106-1 according to various criteria.

The POI server 106-1 may arrange (or classify) the POI information and the sensing data according to a frequency of the sensing data. As shown in FIG. 20C, the POI server 106-1 may calculate the number of times (count) each of the plurality of sensing data is received and a ratio of each sensing data to all sensing data for each piece of POI information. In FIG. 20C, the sensing data (00:23:DF:CE:2C:30) is received 3500 times with respect to the same POI and the ratio of the sensing data (00:23:DF:CE:2C:30) to all sensing data may be 35%. The POI server 106-1 may arrange the sensing data according to the calculated number of times of receiving or ratio. The POI server 106-1 may arrange the sensing data according to storing time of the sensing data. The POI server 106-1 may arrange the sensing data based on at least one of the intensity of the signal including the sensing data when the sensing data is collected, the QoS of the signal, or the type of the signal (e.g., coverage of a wireless signal or mobility).

The POI server 106-1 may update the classified data. The POI server 106-1 may store the sensing data only when the number of times the sensing data is received is greater than or equal to a threshold number (e.g., greater than or equal to 1000 times) or the ratio of the sensing data is greater than or equal to a threshold ratio (e.g., greater than or equal to 10%) in FIG. 20C, and may delete the other sensing data from the database. The POI server 106-1 may delete the sensing data when a time during which the sensing data is stored is longer than or equal to a designated time (e.g., a week) and may maintain storage of the sensing data when a time during which the sensing data is stored is shorter than the designated time. The POI server 106-1 may store the sensing data when the intensity of the signal is greater than or equal to a threshold intensity and may delete the other sensing data from the database. The POI server 106-1 may store the sensing data when the QoS of the signal is greater than or equal to a threshold value and may delete the other sensing data from the database. The POI server 106-1 may store the sensing data when the type of the signal is a designated type (e.g., a short range communication signal or a signal having weak mobility) and may delete the other sensing data from the database.

The POI server 106-1 may update at least one of the sensing data and the POI information stored in the database by combining the frequency of the sensing data, the intensity of the signal, the QoS of the signal, or the type of the signal.

The POI server 106-1 may update the database periodically or in real time. The POI server 106-1 may update the database every time the sensing data or the POI information is received from the electronic device 101.

Figure 21:
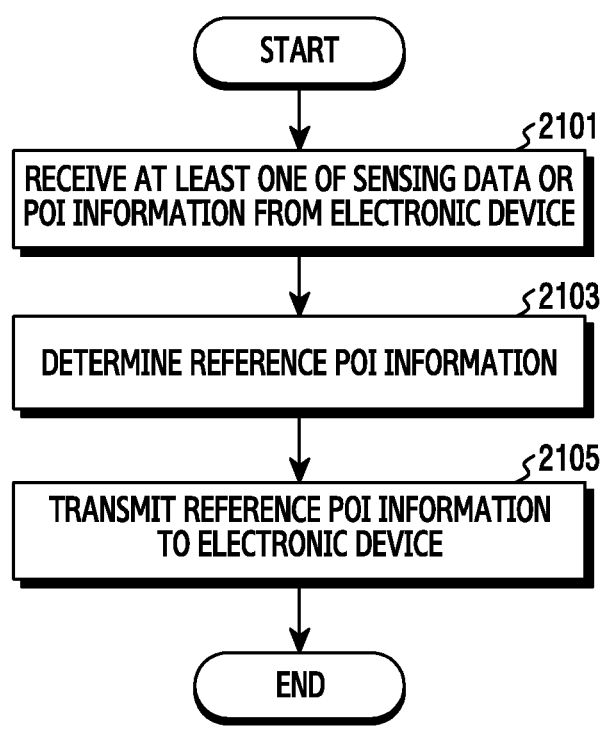
FIG. 21 is a flowchart of a method for providing POI information in a POI server, according to an embodiment of the present disclosure.

FIG. 21 is a flowchart of a method for providing POI information in the POI server, according to an embodiment of the present disclosure.

Referring to FIG. 21, in step 2101, the POI server 106-1 may receive at least one of sensing data or POI information (e.g., primary POI information) from the electronic device 101.

When primary POI information such as a name (or a store name or a name of a store) or a location of a store where payment is performed is extracted by the electronic device 101, the POI server 106-1 may receive the primary POI information from the electronic device 101.

The POI server 106-1 may receive sensing data from the electronic device 101 with the primary POI information.

The POI server 106-1 may receive only the sensing data from the electronic device 101.

In step 2103, the POI server 106-1 may determine reference POI information.

When the POI server 106-1 receives only the primary POI information from the electronic device 101 without receiving sensing data, the POI server 106-1 may determine reference POI information on the primary POI information based on at least a portion of the primary POI information. The POI server 106-1 may receive, from the electronic device 101, information on a location where a message including a store name on a place of the electronic device 101 with a portion thereof being omitted and information on payment is received. The POI server 106-1 may determine, as reference POI information, the most similar store name to the store name with the portion thereof being omitted, received from the electronic device 101, from among store names located within a designated distance (e.g., 10 meter) from the location where the message is received. The POI server 106-1 may determine the same or most similar POI information as or to the primary POI information as reference POI information by searching the database, or may request a server provided by a third party (e.g., a web server or a finance company server) to search for more exact POI information regarding the primary POI information and may determine the POI information received from the server provided by the third party as reference POI information.

When the POI server 106-1 receives the primary POI information and the sensing data or receives only the sensing data from the electronic device 101, the POI server 106-1 may determine reference POI information by searching the database (e.g., a mapping DB) in which the POI information and the sensing data are mapped onto each other and stored. When the POI server 106-1 receives the primary POI information and the sensing data from the electronic device 101, the POI server 106-1 may search for data matching the primary POI information and the sensing data received from the electronic device 101 in the database (e.g., the mapping DB 540), and may determine POI information of the searched data as reference POI information.

When the POI server 106-1 receives only the sensing data from the electronic device 101, the POI server 106-1 may determine POI information mapped onto sensing data matching the sensing data received from the electronic device 101 in the database (e.g., the mapping DB) as reference POI information.

In step 2105, the POI server 106-1 may transmit the reference POI information to the electronic device 101.

Although not illustrated in FIG. 21, the POI server 106-1 may receive sensing data and reference POI information which are mapped in the electronic device 101 from the electronic device 101.

When the electronic device 101 transmits only the primary POI information to the POI server 106-1 without sensing data and receives reference POI information from the POI server 106-1, the electronic device 101 may map sensing data, which is temporarily stored at the time of receiving the reference POI information from the POI server 106-1, and the reference POI information. The POI server 106-1 may receive the mapped sensing data and reference POI information from the electronic device 101.

When the electronic device 101 transmits the primary POI information to the POI server 106-1 with the sensing data and receives reference POI information from the POI server 106-1, the electronic device 101 may map the sensing data and the reference POI information received from the POI server 106-1. The POI server 106-2 may receive the mapped sensing data and reference POI information from the electronic device 101.

When the electronic device 101 transmits the primary POI information to the POI server 106-1 with the sensing data and receives reference POI information from the POI server 106-1, the electronic device 101 may map and store the sensing data and the reference POI information, and may not transmit the mapped sensing data and reference POI information to the POI server 106-1. When the POI server 106-1 receives the primary POI information from the electronic device 101 with the sensing data and determines reference POI information on the primary POI information, the POI server 106-1 may map and store the reference POI information determined at the POI server 106-1 and the sensing data although the POI server 106-1 does not receive mapped sensing data and reference POI information from the electronic device 101.

When the electronic device 101 transmits only the sensing data to the POI server 106-1 without primary POI information and receives reference POI information on the sensing data from the POI server 106-1, the electronic device 101 may map the sensing data and the reference POI information received from the POI server 106-1. The POI server 106-1 may receive the mapped sensing data and reference POI information from the electronic device 101. Even when the electronic device 101 transmits only the sensing data to the POI server 106-1 and receives reference POI information from the POI server 106-1, the electronic device 101 may map the sensing data and the reference POI information and store the mapped sensing data and reference POI information, and may not transmit the mapped sensing data and reference POI information to the POI server 106-1, such as in the case in which the electronic device 101 transmits the primary POI information to the POI server 106-1 with the sensing data and receives reference POI information from the POI server 106-1.

Although not illustrated in FIG. 21, the POI server 106-1 may request feedback on the POI information from the electronic device 101. When the POI server 106-1 is not able to search for reference POI information based on at least a portion of the POI information and the sensing data received from the electronic device 101, the POI server 106-1 may request the feedback from the electronic device 101.

The POI server 106-1 may receive feedback on the POI information from the electronic device 101. When the feedback on the POI information is received from the electronic device 101, the POI server 106-1 may update the database 106-2 based on at least a portion of the received feedback. The POI server 106-1 may update the database 106-2 by reflecting POI information included in the feedback on the POI information received from the electronic device 101. The POI server 106-1 may include a separate database (e.g., the feedback DB 550) for managing (or storing) the feedback on the POI information. When the POI server 106-1 is not able to search for reference POI information based on at least a portion of the POI information or the sensing data received from the electronic device 101, the POI server 106-1 may store at least a portion of the received POI information or sensing data in the database for the feedback. When the feedback on the POI information is received from the electronic device 101, the POI server 106-1 may store the POI information included in the feedback in the database for the feedback.

Figure 22:
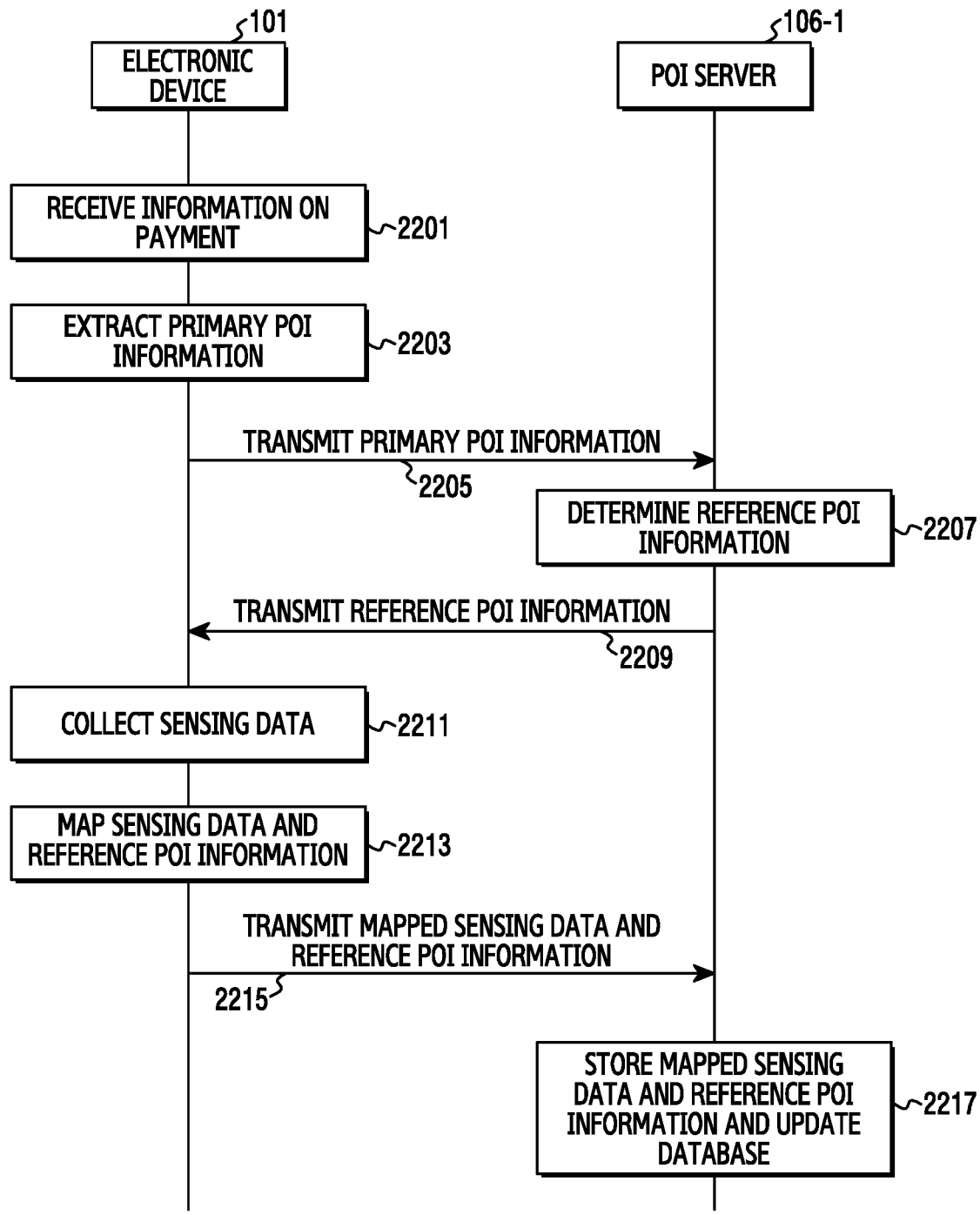
FIG. 22 is a diagram of a system for providing POI information, according to an embodiment of the present disclosure.

FIG. 22 is a diagram of a system for providing POI information, according to an embodiment of the present disclosure.

Referring to FIG. 22, in step 2201, the electronic device 101 may receive information on payment.

The electronic device 101 may execute a mobile application (e.g., a Samsung pay application), and may perform communication for payment with an external electronic device using one of the wireless communication circuits while directly establishing wireless connection to the external electronic device (e.g., a POS device). When the electronic device 101 uses a mobile payment service, the electronic device 101 may receive information on payment from a server providing a payment service (e.g., a payment server or a purchase server).

When the user of the electronic device 101 performs payment using a card (e.g., a real credit card, an electronic credit card, or the like), the electronic device 101 may receive information on payment from a server (e.g., a server of a finance company). The electronic device 101 may receive the information on the payment (or a result of payment) in the form of an SMS, an LMS, or a multimedia SMS.

In step 2203, the electronic device 101 may extract primary POI information from at least a portion of the information on the payment.

When the user performs mobile payment using the electronic device 101, the electronic device 101 may receive information on payment from a mobile payment server (e.g., a server supporting the Samsung pay application). The electronic device 101 may extract primary POI information such as a name (or a store name or a name of a store) or a location of a store where payment is performed by parsing a text or an image indicating the result of payment.

When the user performs payment using a credit card, the electronic device 101 may extract primary POI information by parsing a message or the like received as the payment is performed.

When the electronic device 101 receives a message including the information on the payment, the electronic device 101 may extract information on a location where the message is received as primary POI information. The electronic device 101 may extract the information on the location where the message is received, as primary POI information, by referring to a header portion of the message or based on information acquired through a location determination sensor (e.g., a GPS sensor) included in the electronic device 101 or received from a base station which transmits the message.

In step 2205, the electronic device 101 may transmit the extracted primary POI information to the POI server 106-1.

When the primary POI information such as the name (or a store name or a name of a store) or the location of the store where the payment is performed is extracted, the electronic device 101 may transmit the primary POI information to the POI server 106-1 using a communication module in order to acquire reference POI information from the POI server 106-1.

In step 2207, the POI server 106-1 may determine reference POI information.

When the POI server 106-1 receives the primary POI information from the electronic device 101, the POI server 106-1 may determine reference POI information on the primary POI information based on at least a portion of the primary POI information. The POI server 106-1 may receive, from the electronic device 101, information on a location where a message including a store name with a portion thereof being omitted and information on payment is received. The POI server 106-1 may determine, as reference POI information, the most similar store name to the store name with the portion thereof being omitted, received from the electronic device 101, from among store names located within a designated distance (e.g., 10 meter) from the location where the message is received. The POI server 106-1 may determine POI information that is the same as or most similar to the primary POI information as reference POI information by searching the database 106-2, or may request a server provided by a third party (e.g., a web server or a finance company server) to search for more exact POI information on the primary POI information and may determine POI information received from the server provided by the third party as reference POI information.

In step 2209, the POI server 106-1 may transmit the reference POI information to the electronic device 101.

In step 2211, the electronic device 101 may collect sensing data.

When the reference POI information is received, the electronic device 101 may activate a device for collecting sensing data. The electronic device 101 may activate one or more of a plurality of wireless communication modules (e.g., the cellular module 221, the Wi-Fi module 222, the BT module 223, the BLE module 223-1, or the NFC module 225) or the sensor module 240 (e.g., a GPS module) in order to collect sensing data.

The electronic device 101 may collect sensing data using at least one of the activated plurality of wireless communication modules or sensor module. The electronic device 101 may collect sensing data by receiving a signal from a device located (or disposed) inside the place where the electronic device 101 is located, a device (e.g., a base station) located in the proximity of the electronic device 101, or a GPS satellite. The sensing data may be data on unique information of the device which transmits the signal. The sensing data may include a MAC address of the device.

In step 2213, the electronic device 101 may map the sensing data collected in step 2211 and the reference POI information received from the POI server 106-1 in step 2209. The electronic device 101 may store the mapped sensing data and reference POI information in the memory 130.

In step 2215, the electronic device 101 may transmit the mapped sensing data and reference POI information to the POI server 106-1.

In step 2217, the POI server 106-1 may store the mapped sensing data and reference POI information and update the database 106-2.

The POI server 106-1 may update at least one of the sensing data and the reference POI information stored in the database 106-2 based on at least a portion of at least one of a frequency of the sensing data, an intensity of a signal, a QoS of the signal, or a type of the signal.

Figure 23:
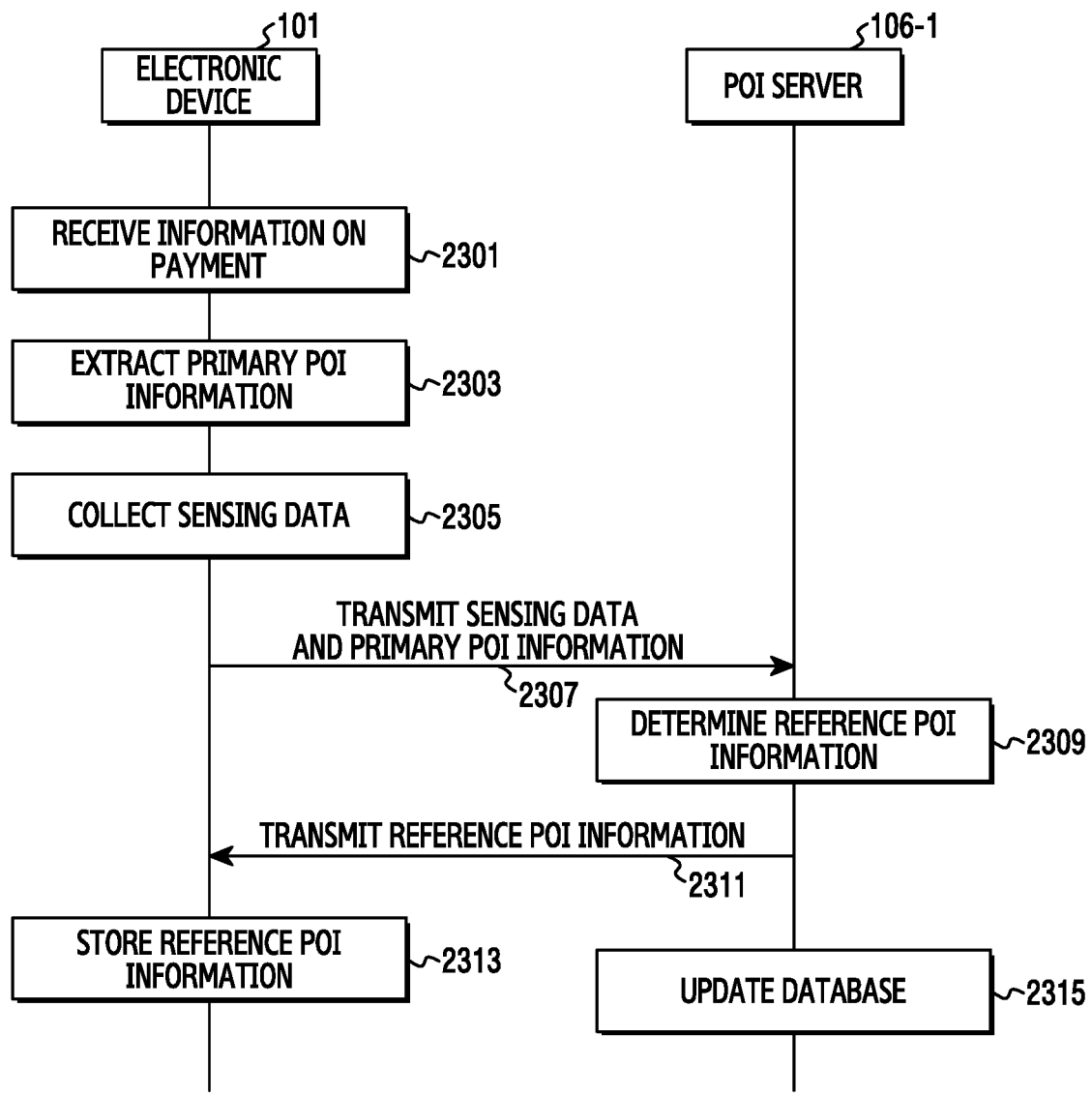
FIG. 23 is a diagram of a system for providing POI information, according to an embodiment of the present disclosure.

FIG. 23 is a diagram of a system for providing POI information, according to an embodiment of the present disclosure.

Referring to FIG. 23, in step 2301, the electronic device 101 may receive information on payment.

The electronic device 101 may execute a mobile application (e.g., a Samsung pay application), and may perform communication for payment with an external electronic device using one of the wireless communication circuits while directly establishing wireless connection to the external electronic device (e.g., a POS device). When the electronic device 101 uses a mobile payment service, the electronic device 101 may receive information on payment from a server providing a payment service (e.g., a payment server or a purchase server).

When the user of the electronic device 101 performs payment using a card (e.g., a real credit card, an electronic credit card, or the like), the electronic device 101 may receive information on payment from a server (e.g., a server of a finance company). The electronic device 101 may receive the information on the payment (or a result of payment) in the form of an SMS, an LMS, or a multimedia SMS.

In step 2303, the electronic device 101 may extract primary POI information from at least a portion of the information on the payment.

When the user performs mobile payment using the electronic device 101, the electronic device 101 may receive information on payment from a mobile payment server (e.g., a server supporting the Samsung pay application). The electronic device 101 may extract primary POI information such as a name (or a store name or a name of a store) or a location of a store where payment is performed by parsing a text or an image indicating the result of payment.

After receiving the information on the payment from a payment server of the credit card (e.g., a server of a credit card company) used for mobile payment, in addition to from the mobile payment server, the electronic device 101 may extract the primary POI information by parsing the information on the payment.

When the user performs payment using a credit card, the electronic device 101 may extract the primary POI information by parsing a message or the like received as the payment is performed.

When the electronic device 101 receives a message including the information on the payment, the electronic device 101 may extract information on a location where the message is received as primary POI information. The electronic device 101 may extract the information on the location where the message is received, as primary POI information, by referring to a header portion of the message or based on information acquired through a location determination sensor (e.g., a GPS sensor) included in the electronic device 101 or received from a base station which transmits the message.

In step 2305, when the primary POI information is extracted, the electronic device 101 may collect sensing data.

The electronic device 101 may activate a device for collecting sensing data. The electronic device 101 may activate one or more of a plurality of wireless communication modules (e.g., the cellular module 221, the Wi-Fi module 222, the BT module 223, the BLE module 223-1, or the NFC module 225) or the sensor module 240 (e.g., a GPS module) in order to collect sensing data.

The electronic device 101 may collect sensing data using at least one of the activated plurality of wireless communication modules or sensor module. The electronic device 101 may collect sensing data by receiving a signal from a device located (or disposed) inside the place where the electronic device 101 is located, a device (e.g., a base station) located in the proximity of the electronic device 101, or a GPS satellite. The sensing data may be data on unique information of the device which transmits the signal. The sensing data may include a MAC address of the device.

In step 2307, the electronic device 101 may transmit the sensing data and the primary POI information to the POI server 106-1. Step 2307 may further include an operation of mapping, by the electronic device 101, the extracted primary POI information and the collected sensing data.

In step 2309, the POI server 106-1 may determine reference POI information. When the POI server 106-1 receives the primary POI information and the sensing data from the electronic device 101, the POI server 106-1 may determine reference POI information by searching a database (e.g., a mapping DB) in which POI information and sensing data are mapped onto each other and stored. When the POI server 106-1 receives the primary POI information and the sensing data from the electronic device 101, the POI server 106-1 may search for data matching the primary POI information and the sensing data which are received from the electronic device 101 from the database, and may determine POI information of the searched data as reference POI information.

In step 2311, the POI server 106-1 may transmit the reference POI information to the electronic device 101.

In step 2313, the electronic device 101 may store the reference POI information received from the POI server 106-1. The electronic device 101 may map and store the sensing data collected in step 2305 and the reference POI information.

In step 2315, the POI server 160-1 may update the database 106-2. The POI server 106-1 may update the database 106-2 based on at least a portion of the sensing data received from the electronic device 101 and the reference POI information determined in step 2309.

Figure 24:
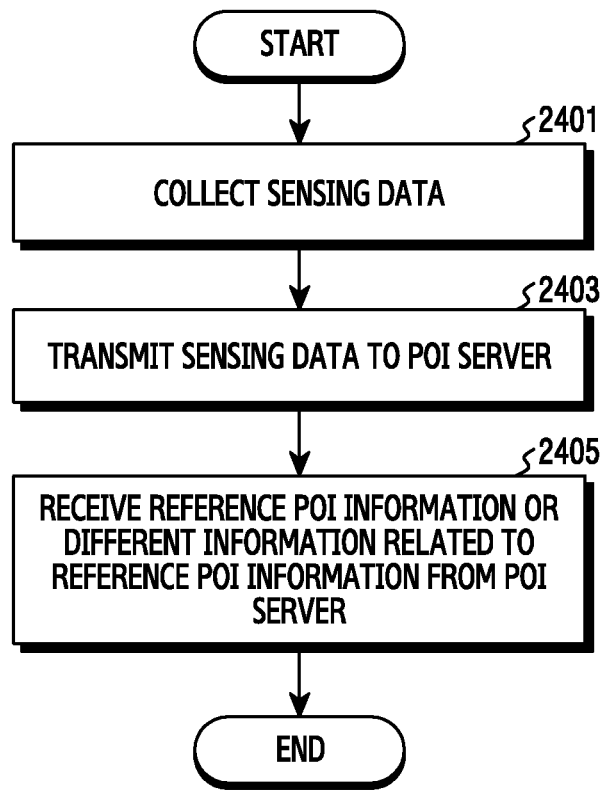
FIG. 24 is a flowchart of a method for providing POI information, according to an embodiment of the present disclosure.

FIG. 24 is a flowchart of a method for providing POI information, according to an embodiment of the present disclosure.

The electronic device 101 of FIG. 24 may be an electronic device which receives POI information without performing payment as the second electronic device 101-3 of FIG. 6B.

Referring to FIG. 24, in step 2401, the electronic device 101 may collect sensing data.

The electronic device 101 may activate a device for collecting sensing data. The electronic device 101 may activate one or more of a plurality of wireless communication modules (e.g., the cellular module 221, the Wi-Fi module 222, the BT module 223, the BLE module 223-1, or the NFC module 225) or the sensor module 240 (e.g., a GPS sensor or the like) in order to collect sensing data.

The electronic device 101 may collect sensing data using at least one of the activated plurality of wireless communication modules or sensor module. The electronic device 101 may collect sensing data by receiving a signal from a device located (or disposed) inside a place where the electronic device 101 is located, a device (e.g., a base station) located in the proximity of the electronic device 101, or a GPS satellite. The sensing data may be data on unique information of a device which transmits a signal. The sensing data may include an MAC address of the device.

The electronic device 101 may filter the sensing data. The electronic device 101 may delete a portion of the collected sensing data by considering an intensity of a signal including the sensing data or a type of the signal.

In step 2403, the electronic device 101 may transmit the collected sensing data to the POI server 106-1. The electronic device 101 may transmit the sensing data to the POI server 106-1 through at least one of the wireless communication circuits.

In step 2405, the electronic device 101 may receive reference POI information or different information related to the reference POI from the POI server 106-1.

The POI server 106-1 may compare the received sensing data and data stored in the database, determine reference POI information corresponding to the received sensing data, and transmit the determined reference POI information to the electronic device 101.

The electronic device 101 may receive information on an event which is ongoing at the place where the electronic device 101 is located from the POI server 106-1, as information related to the POI. When the place where the electronic device 101 is located is a store, the electronic device 101 may receive information on a discount event (or a discount menu) on a product which is ongoing at the store from the POI server 106-1. The electronic device 101 may receive information on an advertisement related to the place where the electronic device 101 is located from the POI server 106-1.

Figure 25:
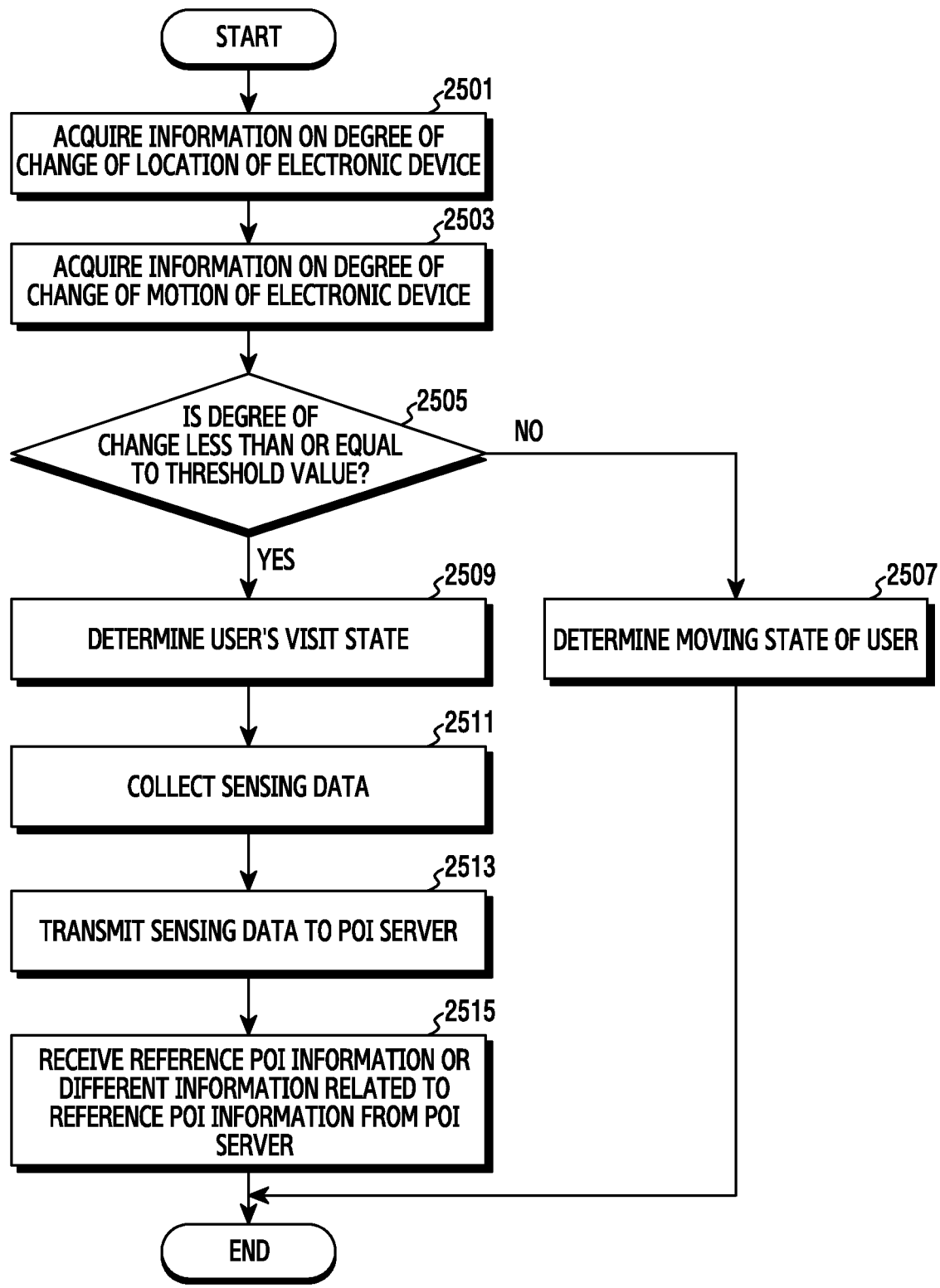
FIG. 25 is a flowchart of a method for providing POI information, according to an embodiment of the present disclosure.

FIG. 25 is a flowchart of a method for providing POI information, according to an embodiment of the present disclosure.

Referring to FIG. 25, in step 2501, the electronic device 101 may acquire information on a change in the location of the electronic device 101.

The electronic device 101 may acquire information on a change in the location of the electronic device 101 based on at least a portion of location information received from a GPS satellite. The electronic device 101 may receive information on latitude and longitude from the GPS satellite using a GPS module in real time or at a time interval. The electronic device 101 may acquire information related to a change in the location of the electronic device 101 by calculating a variation in the latitude and longitude in real time or at a time interval.

The electronic device 101 may acquire information related to a change in the location of the electronic device 101 based on at least a portion of a radio signal received from the surroundings (or environment) of the electronic device 101. The electronic device 101 may acquire information on an intensity of a signal received from surroundings (e.g., an LTE base station or the like) during a designated time (or at a time interval). The electronic device 101 may acquire information on the number of devices (or the number of radio signals) located in the surroundings of the electronic device 101, based on at least a portion of the radio signals received from the surroundings (or environment) of the electronic device 101. The electronic device 101 may receive two Wi-Fi radio signals from two Wi-Fi devices at a time T1, and may receive five Wi-Fi radio signals from five Wi-Fi devices at a time T2. The type of the device located in the surroundings of the electronic device 101 is not limited to the Wi-Fi device. The device which is located in the surroundings of the electronic device 101 and transmits a radio signal to the electronic device 101 may include all devices supporting long range communication like a base station supporting cellular communication, in addition to short range communication devices such as a BLE device, an NFC device, or a BT device. The electronic device 101 may acquire information on the type of the device located in the surroundings of the electronic device 101. The electronic device 101 may receive NFC radio signals from two NFC devices at a time T3, and may receive Wi-Fi radio signals from two Wi-Fi devices at a time T4.

In step 2503, the electronic device 101 may acquire information related to a change in the motion of the electronic device 101.

The electronic device 101 may acquire information on a change in the motion of the electronic device 101 (or information on the motion of the electronic device 101) using at least one of the gyro sensor 240B, the acceleration sensor 240E, or the geomagnetic sensor. The electronic device 101 may acquire information on the motion of the electronic device 101 using the gyro sensor in real time or at a time interval.

The motion of the electronic device 101 may include information on a lying state of the electronic device 101. The electronic device 101 may acquire information on whether the electronic device 101 is placed in a horizontal state or is placed while maintaining a predetermined angle with respect to the horizontal state (or is inclined by a predetermined angle) using at least one of the gyro sensor 240B or the acceleration sensor 240E.

In step 2505, the electronic device 101 may determine whether a change of at least one of the location of the electronic device 101 or the motion of the electronic device 101 is less than or equal to a threshold value.

The electronic device 101 may determine whether a change (or a variation) of at least one of latitude or longitude is less than or equal to a threshold value at least based on a GPS signal received in real time or at a designated time interval.

The electronic device 101 may determine whether a change in the intensity of a radio signal received from an LTE base station is less than or equal to a threshold value in real time or at a time interval.

The electronic device 101 may determine whether a change in the number of devices located in the surroundings of the electronic device 101 is less than or equal to a threshold value in real time or at a time interval.

The electronic device 101 may determine whether a change in the motion of the electronic device 101, acquired using at least one of the gyro sensor 240B, the acceleration sensor 240E, or the geomagnetic sensor, is less than or equal to a threshold value.

Although not illustrated in FIG. 25, the electronic device 101 may determine whether the electronic device 101 is inclined by a predetermined angle with respect to the horizontal state during a designated time.

The electronic device 101 may determine whether the number of times the type of device located in the surroundings of the electronic device 101 is changed is less than or equal to a threshold value in real time or at a time interval.

The electronic device 101 may determine whether the change of at least one of the location of the electronic device 101 or the motion of the electronic device 101 is less than or equal to the threshold value by considering a weight (factor or ratio). The electronic device 101 may set a weight K1 with respect to the change of at least one of latitude or longitude of the electronic device 101, set a weight K2 with respect to the change in the number of Wi-Fi devices, set a weight K3 with respect to the change of the number of BLE devices, and set a weight K4 with respect to the change of the motion of the electronic device 101 detected by the gyro sensor. The electronic device 101 may determine whether a value obtained by multiplying the change in at least one of the location of the electronic device 101 or the motion of the electronic device 101 by the weight factor and then adding the multiplied values (e.g., the change of at least one of latitude or longitude*K1+the change of the number of Wi-Fi devices*K2+the degree of the change of the number of BLE devices*K3+the change in the motion of the electronic device 101*K4) is less than or equal to a threshold value. However, the method of setting the weights and the method of calculating the value to be compared with the threshold value based on the change of at least one of the location of the electronic device 101 or the motion of the electronic device 101 and the set weights are not limited to the above-described example.

In step 2507, when it is determined that the change of at least one of the location of the electronic device 101 or the motion of the electronic device 101 is less than or equal to the threshold value, the electronic device 101 may determine that the user of the electronic device 101 visits a certain place (or stays in a certain place).

In step 2509, when it is determined that the change of at least one of the location of the electronic device 101 or the motion of the electronic device 101 exceeds the threshold value, the electronic device 101 may determine that the user of the electronic device 101 is in a moving state. The electronic device 101 may determine that the user of the electronic device 101 is moving. In step 2509, when it is determined that the user of the electronic device 101 is moving, the electronic device 101 may finish the step of providing POI information without collecting sensing data.

In step 2509, when it is determined that the user of the electronic device 101 visits a certain place, the electronic device 101 may collect sensing data in step 2511. In response to it being determined that the user of the electronic device 101 stays in a certain place rather than being moving, the electronic device 101 may collect sensing data.

In step 2511, the electronic device 101 may transmit the collected sensing data to the POI server 106-1.

In step 2513, the electronic device 101 may receive POI information or different information related to a POI from the POI server 106-1.

Steps 2511 to 2515 of FIG. 25 are the same as or similar to steps 2401 to 2405 of FIG. 24 at least in part, and thus a detailed description thereof is omitted.

Figure 26:
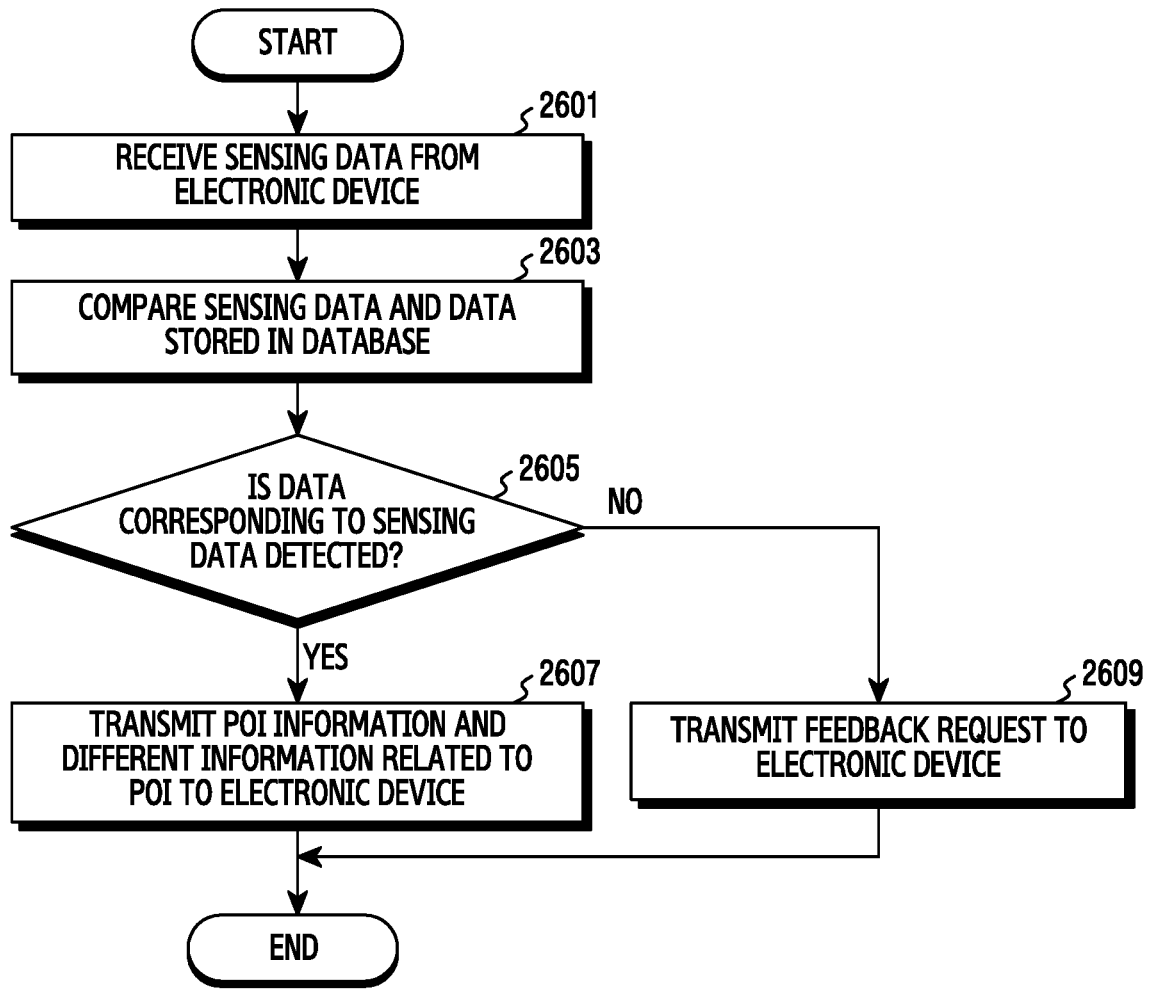
FIG. 26 is a flowchart of a method for providing POI information in a POI server, according to an embodiment of the present disclosure.

FIG. 26 is a flowchart of a method for providing POI information in the POI server, according to an embodiment of the present disclosure.

FIGS. 27A to 27C are diagrams of a method for providing POI information in the POI server, according to an embodiment of the present disclosure.

Referring to FIG. 26 and FIGS. 27A to 27C, in step 2601, the POI server 106-1 may receive sensing data from the electronic device 101.

The sensing data may be data on unique information of a device which transmits a signal. The sensing data may include a MAC address of the device. The POI server 106-1 may receive sensing data (or sensor data) as shown in FIG. 27A from the electronic device 101. The server may receive a Wi-Fi address (00:23:DF:CE:2C:30, 00:14:CE:DF:KS:41) information and BT address (BD) (DB:9E:3F:B4:A4:3E) information from the electronic device 101.

In step 2603, the POI server 106-1 may compare the received sensing data and data stored in the database. The POI server 106-1 may search the data base in which sensing data is stored according to each POI. The POI server 106-1 may search for data (00:23:DF:CE:2C:30, DB:9E:3F:B4:A4:3E) identical to at least a portion of data (00:23:DF:CE:2C:30, 00:14:CE:DF:KS:41, DB:9E:3F:B4:A4:3E) corresponding to the sensing data received from the electronic device 101 as shown in FIG. 27B.

In step 2605, the POI server 106-1 may determine whether data (or POI information) corresponding to the received sensing data is detected.

The server may determine POI information (e.g., Gangnam, A coffee) corresponding to (matching) data (00:23:DF:CE:2C:30, DB:9E:3F:B4:A4:3E) identical to at least a portion of the sensing data received from the electronic device 101 in the database in which the POI information and the sensing data corresponding to each other (mapped onto each other) are stored as shown in FIG. 27B.

When it is determined that data corresponding to the received data is detected in step 2605, the POI server 106-1 may transmit the POI information and different information related to the POI to the electronic device 101.

The POI server 106-1 transmits the POI information to the electronic device 101 using at least one of the wireless communication circuits of the POI server 106-1. The POI server 106-1 may transmit information on the name of the place where the electronic device 101 is located or current location information (e.g., latitude and longitude information) of the electronic device 101 as shown in FIG. 27C to the electronic device 101. As information related to the POI, the POI server 106-1 may transmit information on an event which is ongoing at the place where the electronic device 101 is located to the electronic device 101. When the place where the electronic device 101 is located is a store, the POI server 106-1 may transmit information on a discount event (or a discount menu or the like) on a product which is ongoing at the store to the electronic device 101. The POI server 106-1 may transmit information on an advertisement related to the place where the electronic device 101 is located to the electronic device 101.

When it is determined that data corresponding to the data received at the POI server 106-1 is not detected in step 2605, the POI server 106-1 may transmit a feedback request to the electronic device 101 in step 2609. The POI server 106-1 may request information on the POI where the electronic device 101 is located from the electronic device 101 in order to acquire POI information corresponding to the sensing data received in step 2601.

Step 2609 of requesting, by the POI server 106-1, feedback from the electronic device 101 may be omitted.

Figure 28:
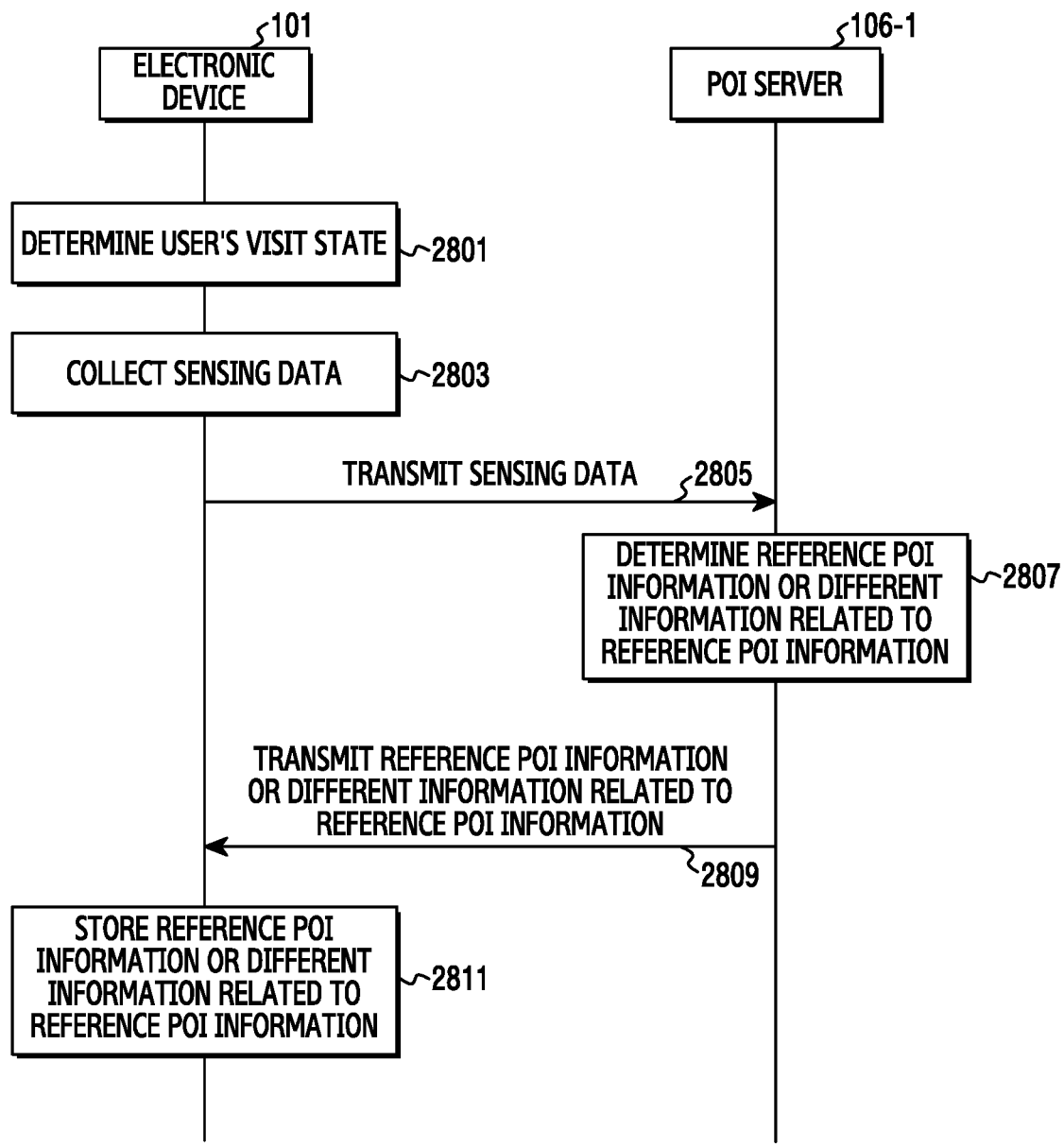
FIG. 28 is a diagram of a system for providing POI information, according to an embodiment of the present disclosure.

FIG. 28 is a diagram of a system for providing POI information, according to an embodiment of the present disclosure.

Referring to FIG. 28, in step 2801, the electronic device 101 may determine a user's visit state, i.e., where the user is located.

For example, the electronic device 101 may acquire information related to a change in the location of the electronic device 101 based on at least a portion of location information received from a GPS satellite. The electronic device 101 may acquire information related to a change in the location of the electronic device 101 based on at least a portion of a radio signal received from the surroundings (or environment) of the electronic device 101.

The electronic device 101 may acquire information related to a change in the motion of the electronic device 101. The electronic device 101 may acquire information on a change in the motion of the electronic device 101 (or information on the motion of the electronic device 101) using at least one of the gyro sensor 240B, the acceleration sensor 240E, or the geomagnetic sensor. The motion of the electronic device 101 may include information on a state of the electronic device 101. The electronic device 101 may acquire information on whether the electronic device 101 is placed in a horizontal state or is placed while maintaining a predetermined angle with respect to the horizontal state (or is inclined by a predetermined angle) using at least one of the gyro sensor 240B or the acceleration sensor 240E.

The electronic device 101 may determine whether a change of at least one of the location of the electronic device 101 or the motion of the electronic device 101 is less than or equal to a threshold value.

The electronic device 101 may determine whether a change (or a variation) of at least one of latitude or longitude is less than or equal to a threshold value at least based on a GPS signal received in real time or at a time interval. The electronic device 101 may determine whether a change in the intensity of a radio signal received from an LTE base station is less than or equal to a threshold value in real time or at a time interval. The electronic device 101 may determine whether a change in the number of devices located in the surroundings of the electronic device 101 is less than or equal to a threshold value in real time or at a time interval. The electronic device 101 may determine whether a change in the motion of the electronic device 101, acquired using at least one of the gyro sensor 240B, the acceleration sensor 240E, or the geomagnetic sensor, is less than or equal to a threshold value.

When it is determined that the change of at least one of the location of the electronic device 101 or the motion of the electronic device 101 is less than or equal to the threshold value, the electronic device 101 may determine that the user of the electronic device 101 visits a certain place (or stays in a certain place).

In step 2803, the electronic device 101 may collect sensing data.

The electronic device 101 may activate a device for collecting sensing data. The electronic device 101 may activate one or more of a plurality of wireless communication modules (e.g., the cellular module 221, the Wi-Fi module 222, the BT module 223, the BLE module 223-1, or the NFC module 225) or the sensor module 240 (e.g., a GPS sensor or the like) in order to collect sensing data.

The electronic device 101 may collect sensing data using at least one of the activated plurality of wireless communication modules or sensor module. The electronic device 101 may collect sensing data by receiving a signal from a device located (or disposed) inside a place where the electronic device 101 is located, a device (e.g., a base station) located in the proximity of the electronic device 101, or a GPS satellite. The sensing data may be data on unique information of a device which transmits a signal. The sensing data may include a MAC address of the device. The electronic device 101 may filter the sensing data. The electronic device 101 may delete a portion of the collected sensing data by considering an intensity of a signal including the sensing data or a type of the signal.

In step 2805, the electronic device 101 may transmit the collected sensing data to the POI server 106-1. The electronic device 101 may transmit the sensing data to the POI server 106-1 through at least one of the wireless communication circuits.

In step 2807, the POI server 106-1 may determine reference POI information or different information related to the reference POI.

The POI server 106-1 may compare the received sensing data and data stored in the database, and may determine reference POI information corresponding to the received sensing data.

The POI server 106-1 may determine information on an event which is ongoing at the place where the electronic device 101 is located, as information related to the reference POI information. When the place where the electronic device 101 is located is a store, the POI server 106-1 may determine information on a discount event (or a discount menu) on a product which is ongoing at the store as information related to the reference POI information. The electronic device 101 may determine information on an advertisement related to the place where the electronic device 101 is located from the POI server 106-1.

In step 2809, the POI server 106-1 may transmit the reference POI information and different information related to the reference POI information to the electronic device 101.

In step 2811, the electronic device 101 may store the reference POI information or the different information related to the reference POI information which are received from the POI server 106-1. The electronic device 101 may output the different information related to the reference POI information, e.g., information on an event which is ongoing at the place where the electronic device 101 is located.

Figure 29:
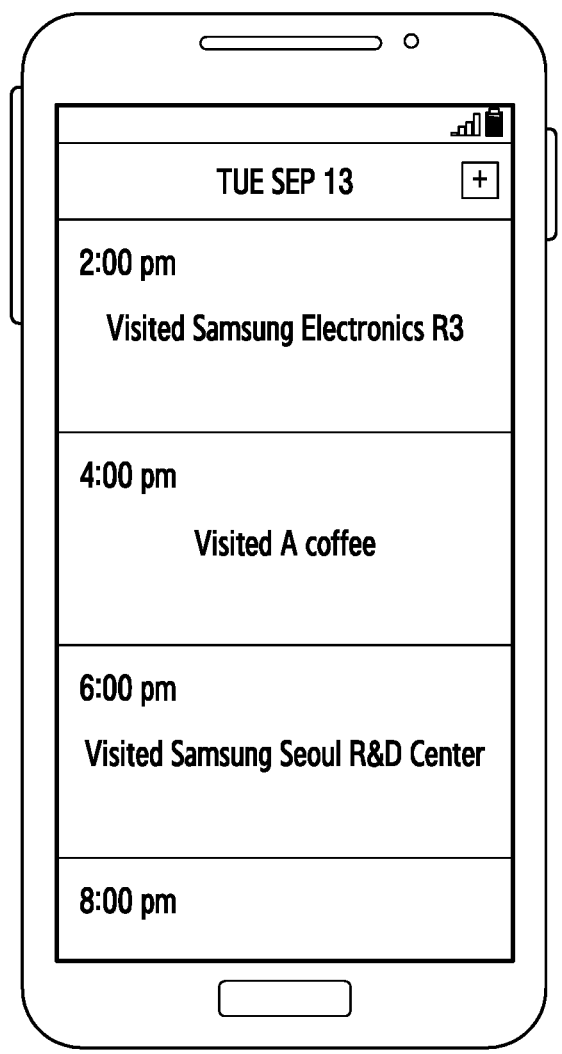
FIG. 29 is a diagram of a method for providing POI information, according to an embodiment of the present disclosure.

FIG. 29 is a diagram of a method for providing POI information, according to an embodiment of the present disclosure.

Referring to FIG. 29, when the electronic device 101 receives POI information from the server, the electronic device 101 may store the received POI information. When the electronic device 101 receives POI information from the server, the electronic device 101 may store the received POI information and information on a time at which the POI information is received.

The electronic device 101 may display the POI information with time using the display 160.

Although not illustrated in FIG. 29, the electronic device 101 may display information related to a POI received from the server, e.g., information on an event which is ongoing at the place where the electronic device 101 is located, using the display.

The electronic device 101 may determine information on a user's spending habit using the POI information received from the server. The electronic device 101 may store information on places the user of the electronic device 101 has visited. The electronic device 101 may determine information on the user's spending habit based on at least a portion of the number of times the user of the electronic device 101 has visited a certain place. When a visit ratio of the user to a certain Korean restaurant is larger than a visit ratio of the user to a certain Japanese restaurant, the electronic device 101 may determine information that the user prefers Korean food to Japanese food.

The electronic device 101 may provide a service to the user of the electronic device 101 in various methods using the information of the user's spending habit. When the user of the electronic device 101 visits a certain restaurant, the electronic device 101 may determine information that the user prefers Korean food and may recommend a menu related to Korean food in a food menu of the restaurant the user visits.

The electronic device 101 may determine a pattern on the places that the user of the electronic device 101 has visited and may recommend a next or another place to visit from a current location. When the electronic device 101 has a visit pattern (or a visit record) of the user of the electronic device 101 having visited in order of places A, B, and C, and the user is currently at the place B, the electronic device 101 may recommend the place C as a next place to visit.

The method for providing POI information and the electronic device supporting the same may provide a variety of information including POI information where the electronic device is located as well as information on the location of the electronic device.

In addition, the structure of the data described herein may be recorded on a non-transitory computer readable recording medium through various means or devices. The non-transitory computer readable recording medium may include a storage medium such as a magnetic storage medium (e.g., ROM, a floppy disk, a hard disk, or the like) and an optical reading medium (e.g., a CD-ROM, a DVD, or the like).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
   a housing;
   a touch screen display;
   an antenna;
   a wireless communication circuit electrically connected to the antenna;
   at least one sensor configured to collect sensing data regarding environments where the electronic device is located;

a processor electrically connected to the touch screen display, the wireless communication circuit, and the at least one sensor; and a memory electrically connected with the processor, wherein, based on instructions stored in the memory, the processor is configured to:

determine whether the electronic device stays at a location more than a specific period of time;

collect the sensing data regarding environments at the location of the electronic device using one of the wireless communication circuit and the at least one sensor upon determining that the electronic device stays at the location more than the specific period of time;

transmit the collected sensing data regarding environments to an external server through the wireless communication circuit;

receive, through the wireless communication circuit, point of interest (POI) information related to the location or different information related to the POI information from the external server identified based on the collected sensing data regarding environments of the electronic device using a database of the external server including mapping information of the POI information and the sensing data at the location, wherein the database of the external server is updated using payment-related information generated by at least one second electronic device and another sensing data regarding environments of the at least one second electronic device within a predetermined range from the location of the electronic device, and wherein the payment-related information is sent to the external server to be stored in association with information related to the location.

2. The electronic device of claim 1, wherein, based on the stored instructions, the processor is further configured to transmit the sensing data using one of near field communication (NFC) protocols, Bluetooth protocols, and magnetic stripe transmission (MST) protocols.

3. The electronic device of claim 1, wherein, based on the stored instructions, the processor is further configured to collect the sensing data using one of a cellular radio signal, a wireless fidelity (Wi-Fi) signal, a Bluetooth signal, and a near field communication (NFC) signal.

4. The electronic device of claim 1, wherein, based on the stored instructions, the processor is further configured to associate the POI information with the sensing data collected at the location of the electronic device after receiving the POI information, which is analyzed at the external server, from the external server.

5. The electronic device of claim 1, wherein, based on the stored instructions, the processor is further configured to transmit the sensing data to the external server using a mobile application.

6. The electronic device of claim 1, wherein, based on the stored instructions, the processor is further configured to transmit the collected sensing data with the POI information to the external server when the collected sensing data is matched to the POI information.

7. The electronic device of claim 1, wherein, based on the stored instructions, the processor is further configured to filter the collected sensing data based in part on one of an intensity of a signal including the collected sensing data, a quality of service (QOS) of the signal, and a type of the signal.

8. The electronic device of claim 1, wherein, based on the stored instructions, the processor is further configured to receive a feedback request on the POI information from the external server, and transmit a response to the feedback request to the external server.

9. The electronic device of claim 1, wherein, based on the stored instructions, the processor is further configured to:

acquire one of information related to the location of the electronic device and information related to a motion of the electronic device;

when a change in one of the location of the electronic device and the motion of the electronic device is less than or equal to a threshold value, determine that a user of the electronic device stays at the location; and collect sensing data regarding environments at the location of the electronic device.

10. The electronic device of claim 9, wherein, based on the stored instructions, the processor is further configured to compare the change in one of the location of the electronic device and the motion of the electronic device with the threshold value.

11. The electronic device of claim 1, wherein the different information related to the POI information is information on an event which is ongoing at the POI.

* * * * *